(12) United States Patent
Oh

(10) Patent No.: US 9,933,511 B2
(45) Date of Patent: Apr. 3, 2018

(54) SAFETY SCANNER

(71) Applicant: Keyence Corporation, Osaka (JP)

(72) Inventor: Choryon Oh, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 15/410,793

(22) Filed: Jan. 20, 2017

(65) Prior Publication Data

US 2017/0242101 A1 Aug. 24, 2017

(30) Foreign Application Priority Data

Feb. 22, 2016 (JP) .................................. 2016-031507

(51) Int. Cl.
| G01B 11/14 | (2006.01) |
| G01S 7/481 | (2006.01) |
| G01S 17/42 | (2006.01) |
| G08B 13/24 | (2006.01) |
| G08B 13/187 | (2006.01) |
| G08B 13/196 | (2006.01) |
| G08B 29/18 | (2006.01) |

(52) U.S. Cl.
CPC .......... *G01S 7/4813* (2013.01); *G01S 7/4817* (2013.01); *G01S 17/42* (2013.01); *G08B 13/187* (2013.01); *G08B 13/19619* (2013.01); *G08B 13/2491* (2013.01); *G08B 29/183* (2013.01)

(58) Field of Classification Search
CPC ....... G01B 11/00; G01B 11/024; G01B 11/02; G01B 11/26; H05K 13/0413

USPC .......................................................... 356/615
See application file for complete search history.

(56) References Cited

U.S. PATENT DOCUMENTS

| 6,616,044 | B1 * | 9/2003 | Gu ..................... G06K 7/10584 |
| | | | 235/462.14 |
| 7,598,484 | B2 | 10/2009 | Yamaguchi |
| 8,063,780 | B2 | 11/2011 | Onishi |
| 8,069,007 | B2 | 11/2011 | Oh |
| 8,248,235 | B2 | 8/2012 | Inoue et al. |
| 8,319,171 | B2 | 11/2012 | Kawabata |
| 8,330,095 | B2 | 12/2012 | Kawabata |
| 8,415,609 | B2 | 4/2013 | Kawabata et al. |
| 8,648,292 | B2 | 2/2014 | Kawabata et al. |
| 2003/0179350 | A1 * | 9/2003 | Hecht ................ G06K 7/10584 |
| | | | 353/122 |

(Continued)

*Primary Examiner* — Tarifur Chowdhury
*Assistant Examiner* — Md M Rahman
(74) *Attorney, Agent, or Firm* — Kilyk & Bowersox, P.L.L.C.

(57) ABSTRACT

Provided is a safety scanner capable of obtaining uniform optical performance for a view angle of 180° or more. The safety scanner includes an optical rotator that emits detection light from a light source to a detection area and causes the detection light to perform scanning in a circumferential direction, a light receiving element that receives reflected light from an object within the detection area through the optical rotator, a casing that houses the light receiving element. The casing includes a canopy part, a bottom part facing the canopy part, and a coupling part that couples a rear end of the canopy part to a rear end of the bottom part. The protective cover includes a window formed in a circular arc shape, corresponding to an optical path of the detection light and the reflected light, having a central angle larger than 180° with respect to the rotation axis.

10 Claims, 18 Drawing Sheets

(56) References Cited

U.S. PATENT DOCUMENTS

| | | | |
|---|---|---|---|
| 2008/0158555 A1* | 7/2008 | Mori | G01S 7/481 |
| | | | 356/239.2 |
| 2009/0283666 A1 | 11/2009 | Tagashira | |
| 2009/0295577 A1 | 12/2009 | Yamaguchi | |
| 2010/0149330 A1* | 6/2010 | Salgar | G08B 13/19686 |
| | | | 348/143 |
| 2015/0369618 A1* | 12/2015 | Barnard | H05B 37/0272 |
| | | | 701/491 |
| 2016/0155306 A1 | 6/2016 | Kawanaka et al. | |
| 2016/0163171 A1 | 6/2016 | Yamazaki et al. | |
| 2017/0242099 A1 | 8/2017 | Yamazaki | |
| 2017/0242110 A1 | 8/2017 | Tomoshi et al. | |
| 2017/0242111 A1 | 8/2017 | Tagashira et al. | |
| 2017/0242123 A1 | 8/2017 | Yamazaki et al. | |

* cited by examiner

A-A SECTIONAL VIEW

SAFETY SCANNER

CROSS-REFERENCE TO RELATED APPLICATIONS

The present application claims foreign priority based on Japanese Patent Application No. 2016-031507, filed Feb. 22, 2016, the contents of which is incorporated herein by reference.

BACKGROUND OF THE INVENTION

1. Field of the Invention

The present invention relates to a safety scanner, and more particularly, to an improvement of a safety scanner that optically senses an intruder into a protection area.

2. Description of Related Art

An optical safety sensor is an area monitoring device which optically senses an intruder such as a person intruded into a protection area and outputs a safety control signal for emergently stopping a machine such as a machine tool or an industrial robot (e.g., JP 2009-296087 A and JP 2009-294734 A).

For example, a safety scanner is an optical scanning area monitoring device provided with an optical rotator which emits detection light from a light source to a detection area and causes the detection light to perform scanning in the circumferential direction, a light receiving element which receives reflected light from an object within the detection area through the optical rotator and generates a light receiving signal, and an intruder determination section which obtains a distance measurement position corresponding to a distance to the object and a scanning angle of the detection light on the basis of the light receiving signal and compares the distance measurement position with a predetermined protection area to determine the presence or absence of an intruder.

Typically, a safety scanner is provided with a casing which houses a light receiving element and an intruder determination section, and a protective cover for protecting an optical rotator. For example, in a safety scanner that covers an optical rotator with a U-shaped metal casing and a protective cover, the protective cover is attached to the metal casing from the front side thereof. Further, maintenance of the optical rotator and the like is required or the protective cover is required to be replaced when damaged. Thus, the protective cover is required to be detachably attached to the metal casing.

In a conventional safety scanner, the cross section of the protective cover taken along a plane perpendicular to a rotation axis of the optical rotator is formed in a circular arc shape on the front side with respect to the rotation axis and in a linear shape on the rear side with respect to the rotation axis to ensure the view angle of 180° or more. Thus, the curvature of the protective cover differs between the front side and the rear side with respect to the rotation axis, which disadvantageously changes the optical performance depending on a scanning angle of detection light.

In a safety scanner that covers an optical rotator only with a protective cover, the protective cover is attached to a lower casing from the upper side. Thus, the above technical problem does not occur.

SUMMARY OF THE INVENTION

The present invention has been made in view of the above circumstances, and an object thereof is to provide a safety scanner capable of obtaining uniform optical performance for a view angle of 180° or more. In particular, an object of the present invention is to provide a safety scanner that includes a protective cover detachably attached to a casing and is capable of obtaining uniform optical performance for a view angle of 180° or more without increasing the size of the casing.

According to one embodiment of the invention, a safety scanner includes an optical rotator that rotates around a rotation axis extending in an up-down direction to emit detection light from a light source to a detection area and cause the detection light to perform scanning in a circumferential direction; a light receiving element that receives reflected light from an object within the detection area through the optical rotator and generates a light receiving signal; an intruder determination section that obtains a distance measurement position corresponding to a distance to the object and a scanning angle of the detection light on the basis of the light receiving signal and compares the distance measurement position with a predetermined protection area to determine the presence or absence of an intruder; a casing that houses the light receiving element and the intruder determination section; and a protective cover for protecting the optical rotator. The casing includes a canopy part, a bottom part facing the canopy part, and a coupling part that couples a rear end of the canopy part to a rear end of the bottom part. The optical rotator is disposed between the canopy part and the bottom part. The protective cover includes a window part that transmits the detection light and the reflected light therethrough, and a cross section of the window part taken along a plane perpendicular to the rotation axis has a circular arc shape on a front side with respect to the rotation axis and a curved shape curved inward on a rear side with respect to the rotation axis.

In the safety scanner, the cross section of the window part of the protective cover taken along the plane perpendicular to the rotation axis of the optical rotator has a curved shape. Thus, uniform optical performance can be obtained for a view angle of 180° or more.

According to another embodiment of the invention, in the safety scanner, in addition to the above configuration, a rear end of the window part extends around to a back of a passage region of the optical rotator when viewed from a front side. Such a configuration makes it possible to obtain uniform optical performance for a view angle of 180° or more without increasing the width in the right-left direction of the protective cover.

According to still another embodiment of the invention, in the safety scanner, in addition to the above configuration, the protective cover is detachably attached to the casing from the front side, the canopy part or the bottom part includes stoppers for restricting movement of the protective cover in a front direction, and the stoppers have a shape projecting in a right-left direction from a side face of the casing, are disposed on a left side face and a right side face of the canopy part or the bottom part, and are engaged with recesses formed on the protective cover.

According to such a configuration, the stoppers of the canopy part or the bottom part have a shape projecting in the right-left direction. Thus, in order to detach the protective cover from the casing, it is necessary to release the engagement between the stoppers and the recesses of the protective cover by expanding the protective cover in the right-left direction. That is, when the protective cover is detached from the casing, the protective cover is expanded in the right-left direction. Thus, the protective cover can be detached without interference between the window part and the optical rotator. Further, the structure that prevents interference with the optical rotator using the expansion of the protective cover in the right-left direction produced by the rear ends of the recesses riding on the stoppers is employed. Thus, an increase in the size of the safety scanner can be suppressed.

According to still another embodiment of the invention, in the safety scanner, in addition to the above configuration, the protective cover is detachably attached to the casing from a front side and includes stoppers for restricting movement in a front direction with respect to the casing, the stoppers have a shape projecting in a right-left direction from an inner face of the protective cover, are disposed facing a left side face and a right side face of the canopy part or the bottom part, and are engaged with recesses formed on the left side face and the right side face.

According to such a configuration, the stoppers of the protective cover have a shape projecting in the right-left direction. Thus, in order to detach the protective cover from the casing, it is necessary to release the engagement between the stoppers and the recesses of the canopy part or the bottom part by expanding the protective cover in the right-left direction. That is, when the protective cover is detached from the casing, the protective cover is expanded in the right-left direction. Thus, the protective cover can be detached without interference between the window part and the optical rotator. Further, the structure that prevents interference with the optical rotator using the expansion of the protective cover in the right-left direction produced by the front ends of the recesses of the canopy part or the bottom part riding on the stoppers of the protective cover is employed. Thus, an increase in the size of the safety scanner can be suppressed.

According to still another embodiment of the invention, in the safety scanner, in addition to the above configuration, a projection length of the stoppers is formed in such a manner that an opening width on the rear end of the window part becomes wider than a width of the passage region of the optical rotator when the engagement with the recesses is released. According to such a configuration, the optical rotator passes through the opening on the rear end of the window part regardless of the orientation of the optical rotator. Thus, it is possible to prevent the window part from making contact with the optical rotator when the protective cover is detached from the casing.

According to still another embodiment of the invention, in the safety scanner, in addition to the above configuration, the protective cover further includes a frame part that holds the window part, the frame part includes an upper frame that extends along an outer edge of the canopy part, a lower frame that extends along an outer edge of the bottom part, and a coupling frame that extends along an outer edge of the coupling part and couples a rear end of the upper frame to a rear end of the lower frame, and the window part and the frame part are joined to each other with an adhesive.

According to such a configuration, the window part and the frame part can be individually molded. Thus, the protective cover can be easily manufactured. Further, the window part and the frame part can be formed of different materials.

According to still another embodiment of the invention, in the safety scanner, in addition to the above configuration, the protective cover further includes a base part that is in contact with an upper face of the bottom part and has a horseshoe shape, and the base part is joined to a lower end of the window part with an adhesive and joined to the lower frame with an adhesive. According to such a configuration, the window part, the frame part and the base part can be individually molded.

According to still another embodiment of the invention, in the safety scanner, in addition to the above configuration, the protective cover further includes a frame part that holds the window part, and a base part that extends along an outer edge of the bottom part, is in contact with an upper face of the bottom part and has a horseshoe shape, the frame part includes an upper frame that extends along an outer edge of the canopy part, and a coupling frame that extends along an outer edge of the coupling part and couples a rear end of the upper frame to a rear end of the base part, and the window part and the frame part are joined to the base part with an adhesive. According to such a configuration, the window part and the frame part, and the base part can be individually molded. Thus, the protective cover can be easily manufactured.

According to still another embodiment of the invention, in the safety scanner, in addition to the above configuration, a cross section of the window part taken along a plane including the rotation axis has a linear shape, the optical rotator includes a receiver mirror that reflects the reflected light toward the light receiving element and a cylindrical lens that forms an image of reflected light reflected by the receiver mirror on a light receiving surface of the light receiving element, and the cylindrical lens includes a cylindrical surface curved in the up-down direction.

According to such a configuration, the focusing position in the up-down direction can be adjusted by the cylindrical lens. Thus, it is possible to reduce focus shift depending on the position on the light receiving surface of the light receiving element caused by a large difference in the curvature of the window part between the scanning direction of the detection light and the up-down direction.

According to the present invention, the cross section of the window part of the protective cover taken along the plane perpendicular to the rotation axis of the optical rotator has a curved shape. Thus, it is possible to provide the safety scanner capable of obtaining uniform optical performance for a view angle of 180° or more. In particular, the structure that prevents interference with the optical rotator using the expansion of the protective cover in the right-left direction produced by the stoppers riding on the steps on the rear ends or the front ends of the recesses is employed. Thus, it is possible to provide the safety scanner that includes the protective cover detachably attached to the casing and is capable of obtaining uniform optical performance for a view angle of 180° or more without increasing the size of the casing.

DETAILED DESCRIPTION OF PREFERRED EMBODIMENT

Hereinbelow, an embodiment of the present invention will be described with reference to the drawings. Although, in the present specification, a direction of a rotation axis of an optical rotator is described as an up-down direction (vertical direction) for convenience, the posture of a safety scanner according to the present invention when used is not limited by the described direction. First, a schematic configuration of an optical safety system as a premise of the present invention will be described below with reference to FIGS. 1 to 3.

<Optical Safety System 1>

Figure 1:
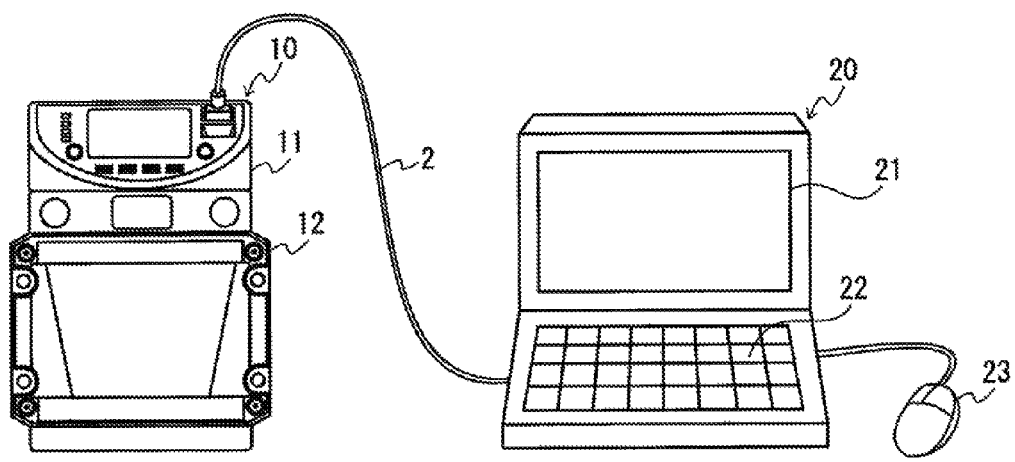
FIG. 1 is a system diagram illustrating a configuration example of an optical safety system which includes a safety scanner according to an embodiment of the present invention.

FIG. 1 is a system diagram illustrating a configuration example of an optical safety system 1 which includes a safety scanner 10 according to an embodiment of the present invention. The optical safety system 1 includes the safety scanner 10 which senses an intruder within a protection area and outputs a sensing signal, and a setting support device 20 which generates setting data for the safety scanner. The safety scanner 10 and the setting support device 20 are connected to each other through a communication cable 2.

The sensing signal is a safety control signal for emergently stopping a machine such as a machine tool or an industrial robot. The sensing signal is output to a safety control device (not illustrated) which controls the machine, for example, to a programmable logic controller (PLC). The operation of a machine as a control target of the safety control device can be stopped by switching an output state of the sensing signal to an off state.

The protection area is a monitoring target area of intruder sensing. For example, an area around machinery and equipment such as a work area of a machine tool or an industrial robot or a moving area of a conveyance vehicle is designated as the protection area.

The safety scanner 10 is an optical scanning safety sensor which optically senses an intruder within the protection area, and includes a display unit 11 and a measurement unit 12. The display unit 11 is a user interface which receives a user operation and displays, for example, an operating state and setting data and provided with a connection port for the communication cable 2 and an output port for a safety control signal.

The measurement unit 12 is a sensor head unit which emits detection light to a detection area and receives reflected light from an object within the detection area to sense an intruder. The detection area is the largest area detectable by the measurement unit 12. The protection area is an area designated within the detection area.

A warning area can be set to the safety scanner 10 in addition to the protection area. When the safety scanner 10 senses an intruder within the warning area, the safety scanner 10 outputs an auxiliary output signal and performs user notification by, for example, lighting an indicator lamp.

For example, the measurement unit 12 is placed on a horizontal floor surface. The display unit 11 includes an output signal switching device (OSSD). When no intruder is present within the protection area, the OSSD is in an on state, and a sensing signal of an on state is output. On the other hand, when an intruder is present within the protection area, the OSSD is in an off state, and a sensing signal of an off state is output.

The setting support device 20 is an information processing terminal, for example, a personal computer which is provided with a display 21, a keyboard 22, and a mouse 23. For example, the setting support device 20 creates setting data for designating the protection area and a measurement condition. The setting data includes area designation information for designating the protection area and measurement setting information for designating the measurement condition. Further, the setting support device 20 performs an operation of acquiring distance measurement information and a camera image from the safety scanner 10 and displaying the acquired information and image on the display 21.

<Safety Scanner 10>

Figure 2:
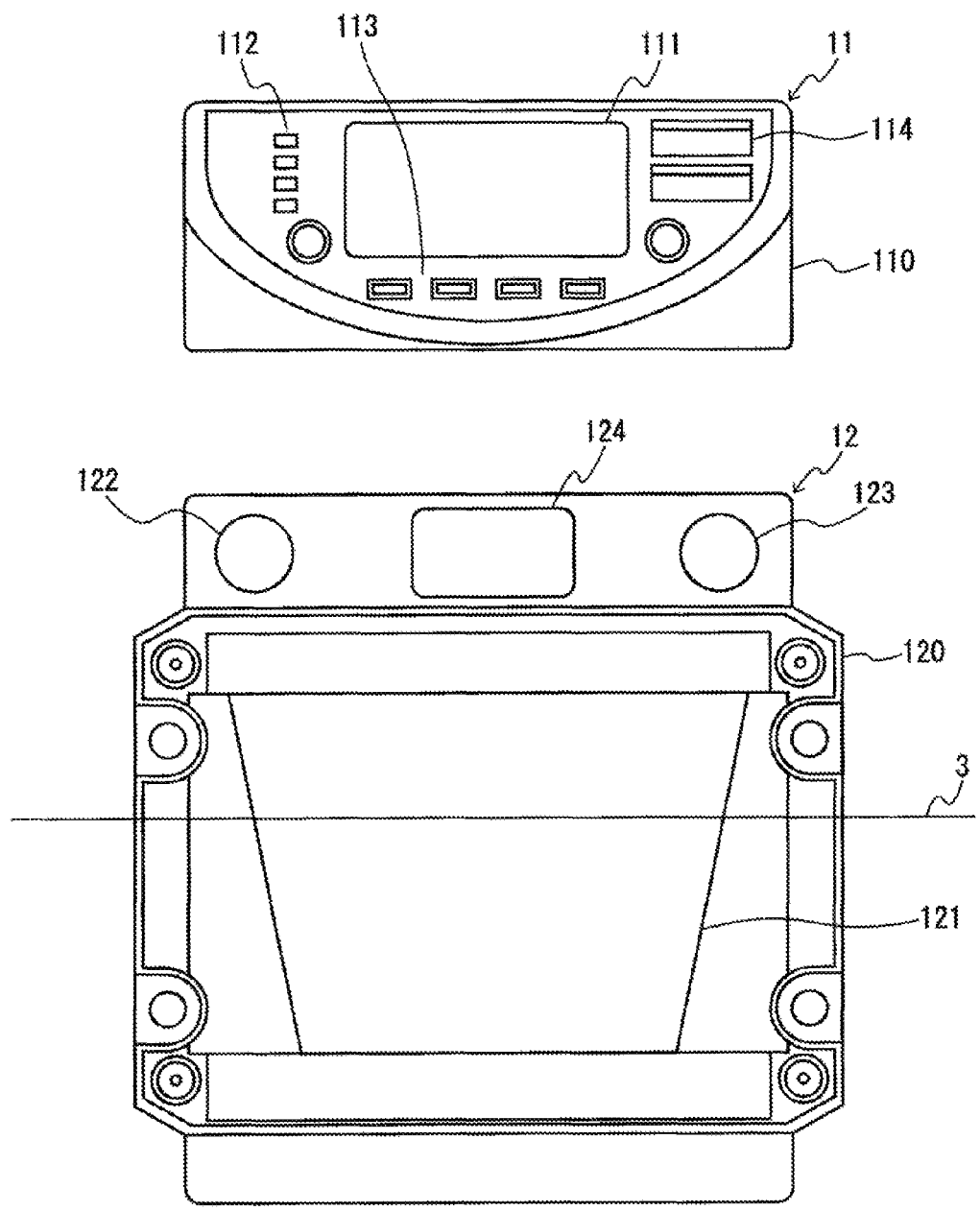
FIG. 2 is a front view illustrating a configuration example of the safety scanner of FIG. 1.

FIG. 2 is a front view illustrating a configuration example of the safety scanner 10 of FIG. 1 and illustrates a separate type safety sensor which includes the display unit 11 separable from the measurement unit 12. FIG. 2 illustrates the safety scanner 10 viewed from the front side. The display unit 11 and the measurement unit 12 are connected to each other through a wiring cable (not illustrated). Two or more measurement units 12 can be connected to the display unit 11 at the same time.

An optical rotator (described below) is disposed in a measurement casing 120 of the measurement unit 12, and a protective cover 121 for protecting the optical rotator is attached to the measurement casing 120. The optical rotator emits detection light in a horizontal direction and causes the detection light to perform scanning along a horizontal scanning plane 3. The scanning plane 3 is a plane perpendicular to the rotation axis of the optical rotator.

For example, laser light having a wavelength in an infrared range is used as the detection light. The detection light repeatedly performs scanning at a constant scanning period. Further, pulse-like detection light is generated at a constant time interval. The protective cover 121 is a shield member which protects an optical system including the optical rotator and detachably attached to the measurement casing 120 from the front side.

The measurement casing 120 is provided with two fixed cameras 122 and 123, and an indicator lamp 124 which indicates an output state of the sensing signal. The fixed cameras 122, 123 and the indicator lamp 124 are disposed above the optical rotator. Note that the fixed cameras 122, 123 and the indicator lamp 124 may be disposed below the optical rotator.

Both the fixed cameras 122 and 123 are imaging devices which capture an image of the protection area to generate a camera image and disposed with different orientations. The fixed camera 122 is disposed on the left side with respect to the indicator lamp 124 when viewed from the side facing the measurement unit 12. On the other hand, the fixed camera 123 is disposed on the right side with respect to the indicator lamp 124 when viewed from the side facing the measurement unit 12. That is, the fixed cameras 122 and 123 are disposed at different positions in the circumferential direction with respect to the rotation axis of the optical rotator. The fixed camera 122 is a camera whose angle of view includes a right side area with respect to the front-rear direction viewed from the measurement unit 12, and the fixed camera 123 is a camera whose angle of view includes a left side area with respect to the front-rear direction viewed from the measurement unit 12. The fixed cameras 122 and 123 are disposed above the scanning plane 3 and thus capable of obtaining a camera image of a bird's eye view of the scanning plane 3.

The fixed cameras 122 and 123 preferably capture not only an image of the protection area, but also an image of the periphery of the protection area. More preferably, the fixed cameras 122 and 123 capture images of an area settable as the warning area and the periphery thereof.

The indicator lamp 124 is an LED indicator which indicates an output state and an operating state of the sensing signal. The indicator lamp 124 is lit in different colors according to the output state of the sensing signal. For example, the indicator lamp 124 is lit in red when the OSSD is in an off state and lit in green when the OSSD is in an on state.

The display unit 11 is disposed on the upper face of the measurement unit 12. A display casing 110 of the display unit 11 is provided with a display panel 111, an indicator lamp 112, an operation key 113, and a cable connection port 114.

The display panel 111 is a display device which screen-displays, for example, an operating state, distance measurement information, a camera image, and setting data. For example, the display panel 111 is a liquid crystal display (LCD) panel. The indicator lamp 112 is an LED indicator for indicating, for example, an operating state and an output state of the sensing signal. The display unit 11 communicates with the measurement unit 12 and is capable of checking an operating state and a sensing history of an intruder even when placed at a position away from the measurement unit 12. The cable connection port 114 is an input/output terminal to which the communication cable 2 is detachably connected.

Figure 3:
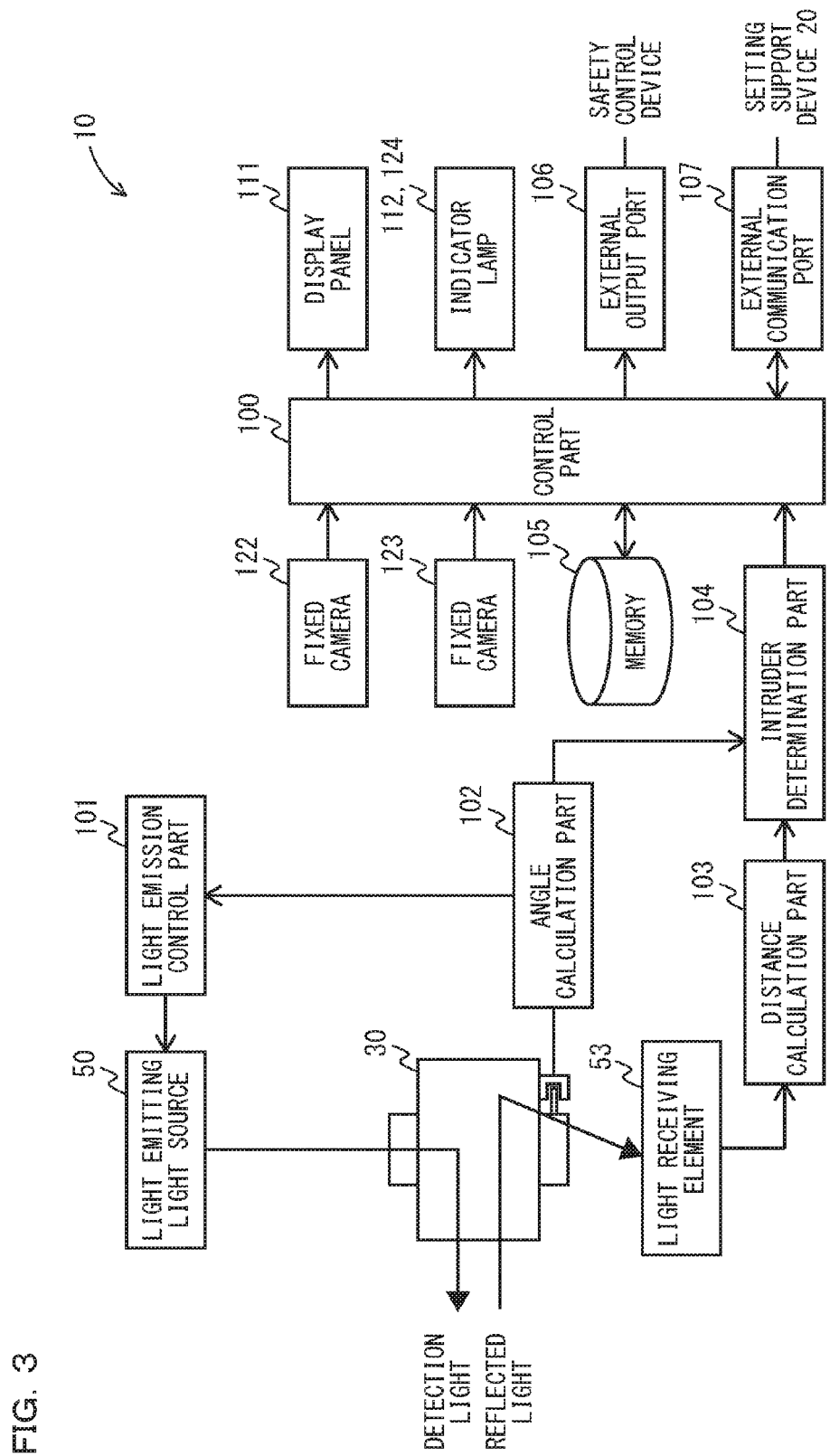
FIG. 3 is a block diagram illustrating an example of a functional configuration in the safety scanner of FIG. 1.

FIG. 3 is a block diagram illustrating an example of a functional configuration in the safety scanner 10 of FIG. 1. The safety scanner 10 includes an optical rotator 30, a light emitting light source 50, a light receiving element 53, a control part 100, a light emission control part 101, an angle calculation part 102, a distance calculation part 103, an intruder determination part 104, a memory 105, an external output port 106, an external communication port 107, the display panel 111, the indicator lamps 112, 124, and the fixed cameras 122 and 123.

The light emitting light source 50 includes a light emitting element such as a laser diode (LD) or a light emitting diode (LED) and generates detection light. The light emission control part 101 controls the light emitting light source 50 so that the light emitting light source 50 generates pulse-like detection light at a constant time interval. The optical rotator 30 emits detection light to an object and causes the detection light to perform scanning in the circumferential direction around the rotation axis.

The light receiving element 53 includes a photoelectric conversion element such as a photodiode (PD), and receives reflected light from the object through the optical rotator 30 and generates a light receiving signal. The angle calculation part 102 detects a rotation of the optical rotator 30 and calculates a scanning angle of the detection light. The light emission control part 101 controls the light emitting light source 50 on the basis of the detection signal from the angle calculation part 102 to adjust an emission timing of the detection light. For example, every time the optical rotator 30 rotates by 360/1000°, the detection light is emitted.

The distance calculation part 103 obtains a distance to the object on the basis of the light receiving signal from the light receiving element 53. The distance calculation part 103 is a measurement unit which performs distance measurement by a time of flight (TOF) system. The distance calculation part 103 measures a receiving timing of the light receiving signal on the basis of the timing of a pulse signal of the angle calculation part 102 and identifies a delay time between when detection light is emitted and when reflected light corresponding to the detection light is received to calculate the distance to the object as a detection distance.

The intruder determination part 104 senses an intruder within the protection area on the basis of distance measurement information corresponding to the detection distance obtained by the distance calculation part 103 and the scanning angle of the detection light and outputs a sensing signal. Whether or not an intruder is present within the protection area is determined by identifying a two-dimensional position of the intruder from the detection distance and the scanning angle of the detection light and checking the identified two-dimensional position against positional information of the protection area.

Further, the intruder determination part 104 senses an intruder within the warning area on the basis of the distance measurement information. When sensing an intruder within the warning area, the intruder determination part 104 performs user notification. The warning area is an area to be a monitoring target of intruder sensing and designated within the detection area. The user notification is performed, for example, by lighting the indicator lamps 112 and 124 in an indication mode different from the case when an intruder within the protection area has been sensed.

The external communication port 107 is a communication interface part which communicates with the setting support device 20, and receives setting data from the setting support device 20 and transmits an operating state, distance measurement information, and a camera image to the setting support device 20. The external output port 106 is an interface part which outputs an output signal (an on state or an off state) of the OSSD to the safety control device as a sensing signal (safety control signal). Note that the external output port 106 may be configured to transmit an output signal (an on state or an off state) of the OSSD to the safety control device as a sensing signal (safety control signal) by two-way communication with the safety control device.

The control part 100 displays setting data, an operating state, distance measurement information, and a camera image on the display panel 111, and indicates an operating state on the indicator lamps 112 and 124. The control part 100 acquires sensing information of an intruder and generates a sensing history on the basis of the sensing information. The sensing history includes a position of the sensed intruder (sensing position), a time when the intruder is sensed (sensing time), and a monitoring image corresponding to the sensing time, and these sensing information items are associated with each other and stored as the sensing history.

The monitoring image recorded as the sensing history includes a still image which is acquired immediately before or after the sensing time and a moving image whose acquisition period includes the sensing time. For example, the moving image is acquired around the sensing time and have a certain time length. Further, camera images captured by the fixed cameras 122 and 123 and a scan image obtained from the distance measurement information are used as these monitoring images.

For example, a user can select, in any manner, whether either a still image or a moving image is recorded as a sensing history or whether either a camera image or a scan image is recorded as a sensing history. A state before and after the sensing time can be easily identified by recording a moving monitoring image as a sensing history. On the other hand, the number of sensing histories that can be stored in the memory 105 can be increased by recording a still monitoring image as a sensing history. The memory 105 is a nonvolatile storage element incorporated in the safety scanner 10. The memory 105 holds, for example, a sensing history created by the control part 100.

Next, a more detailed configuration of the safety scanner 10 according to the present invention will be described below with reference to FIGS. 4 to 18. FIGS. 4 to 14 mainly illustrate a configuration relating to the protective cover 121, and FIGS. 15 to 18 mainly illustrate a configuration relating to the optical rotator 30.

<Measurement Unit 12>

Figure 4:
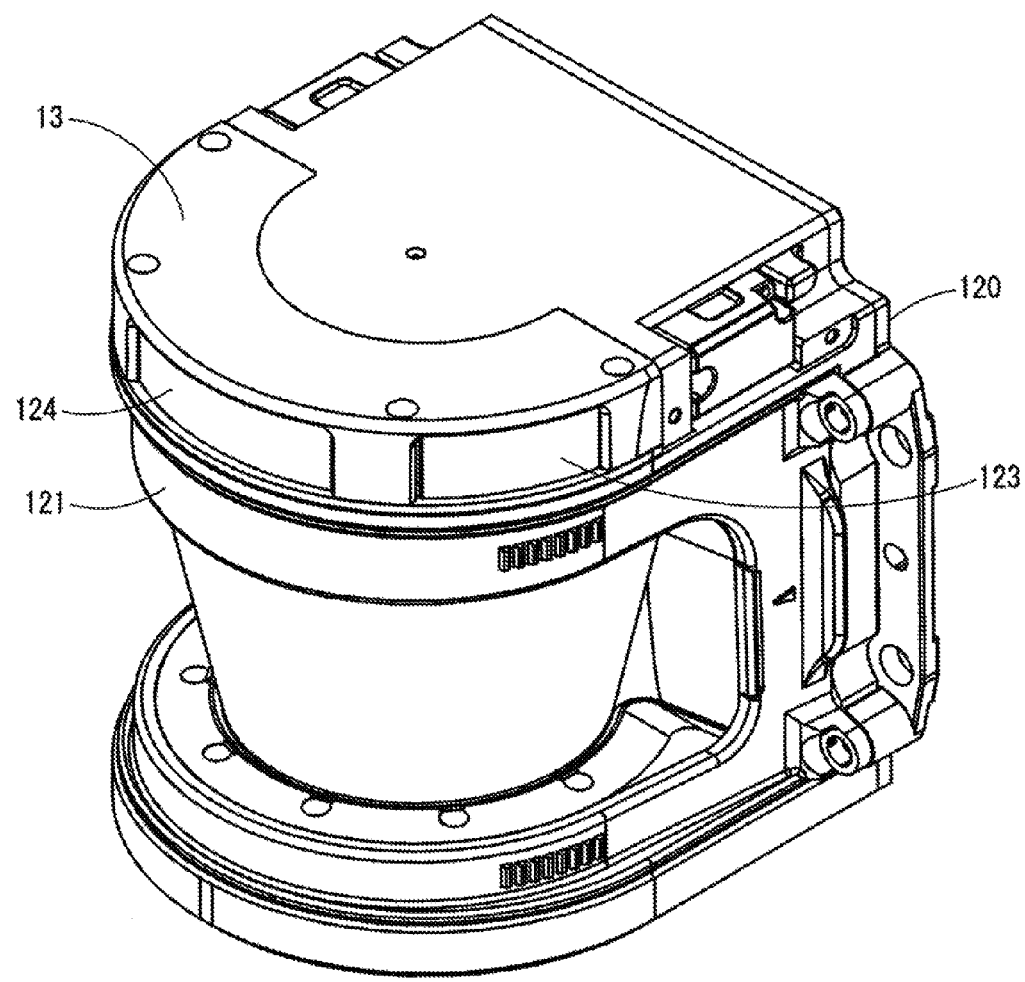
FIG. 4 is a perspective view illustrating a measurement unit of FIG. 2.

FIG. 4 is a perspective view illustrating the measurement unit 12 of FIG. 2. FIGS. 5A and 5B are perspective views illustrating a case in which the protective cover 121 is detached from the measurement casing 120. FIG. 5A illustrates the protective cover 121, and FIG. 5B illustrates the measurement casing 120. FIG. 6 is an explanatory diagram illustrating the measurement unit 12 in a developed manner.

The measurement casing 120 is a U-shaped metal casing, and includes a canopy part 131, a coupling part 132 and a bottom part 133. The canopy part 131 houses the light emitting light source. The bottom part 133 faces the canopy part 131 and houses the light receiving element and the like. The coupling part 132 couples a rear end of the canopy part 131 to a rear end of the bottom part 133. The optical rotator 30 is disposed between the canopy part 131 and the bottom part 133.

As illustrated in FIG. 6, in the safety scanner 10, the optical rotator 30 is supported at both ends by an upper support part 14 and a lower support part 15 which are attached to a back plate 135. The measurement casing 120 is a molded article in which the canopy part 131, the coupling part 132, and the bottom part 133 are integrally formed. The optical rotator 30 is indirectly positioned with respect to the measurement casing 120 by attaching the back plate 135 to the measurement casing 120.

Both cross sections of the canopy part 131 and the bottom part 133 taken along a horizontal plane have a semicircular shape on the front side with respect to the rotation axis of the optical rotator 30 and a rectangular shape on the rear side with respect to the rotation axis. Further, a cross section of the measurement casing 120 taken along a vertical plane that includes the rotation axis of the optical rotator 30 and is parallel to the front-rear direction has a U shape (C shape). The optical rotator 30 is disposed in the U-shaped space.

The canopy part 131 is provided with an indicator lamp module 13. The indicator lamp module 13 includes a resin casing which houses the fixed cameras 122, 123 and the indicator lamp 124. A plurality of light receiving elements 41 for monitoring the transmittance of the protective cover 121 are disposed on the upper face of the bottom part 133. The light receiving elements 41 are disposed at regular intervals in the circumferential direction around the rotation axis of the optical rotator 30. The coupling part 132 is provided with attachment parts 1321, screw receiving parts 1322, and claw holes 1323.

Each of the attachment parts 1321 is a plate-like fixing part for fixing the measurement casing 120 to, for example, a vertical wall of a building using a screw and has a shape projecting from the side face of the coupling part 132. The attachment parts 1321 are formed on the right side face and the left side face of the coupling part 132, and each of the attachment parts 1321 includes two upper and lower screw holes which penetrate the attachment part 1321 in the front-rear direction.

Each of the screw receiving parts 1322 is a fixing part with which a screw for fixing the protective cover 121 to the measurement casing 120 is screwed in the front-rear direction. The screw receiving parts 1322 are formed at two upper and lower positions on the right side face and two upper and lower positions on the left side face of the coupling part 132.

The claw holes 1323 are recesses for housing presser claws 1412 which are formed on the protective cover 121 and recessed rearward. The claw holes 1323 are formed on the right end and the left end of the front face of the coupling part 132. On each of the right and left ends of the coupling part 132, three claw holes 1323 are formed.

The protective cover 121 includes a frame part 141, a window part 142, and a base part 143. The window part 142 is an optical component which transmits detection light from the light emitting light source and reflected light from an object therethrough and has a curved shape extending around to the back of the optical rotator 30. The frame part 141 is a holder component which holds the window part 142. The frame part 141 is provided with screw mount parts 1411, the presser claws 1412, and grip parts 1413.

Each of the screw mount parts 1411 is an attachment part on which a screw for fixing the protective cover 121 to the measurement casing 120 is disposed and has a shape projecting from the side face of the frame part 141. The screw mount parts 1411 are formed at two upper and lower positions on the right side face and two upper and lower positions on the left side face of the frame part 141, and each of the screw mount parts 1411 includes a screw hole which penetrates the screw mount part 1411 in the front-rear direction.

Each of the presser claws 1412 is an engagement part which is engaged with the corresponding claw hole 1323 of the coupling part 132 for pressing the frame part 141 against the side face of the measurement casing 120 and has a shape projecting rearward from the rear end face of the frame part 141. The presser claws 1412 are formed on the right rear end and the left rear end of the frame part 141. On each of the right and left rear ends of the frame part 141, three presser claws 1412 are formed.

Each of the grip parts 1413 is a plate-like handle part which is held with fingers for expanding the frame part 141 in the right-left direction to detach the protective cover 121 and has a shape projecting from the side face of the frame part 141. The grip parts 1413 are formed on the right rear end part and the left rear end part of the frame part 141.

The base part 143 is a horseshoe-shaped optical component which is in contact with the upper face of the bottom part 133, and the lower end of the window part 142 is joined to the inner edge of the base part 143. The window part 142 is held by the frame part 141 through the base part 143. The base part 143 is provided with a plurality of light receiving widows 1431 for transmitting detection light for transmittance monitoring therethrough. The light receiving windows 1431 are disposed at regular intervals in the circumferential direction around the rotation axis of the optical rotator 30.

A packing 134 for sealing the U-shaped space is disposed on the side face of the measurement casing 120. The packing 134 is a seal member which is disposed between the measurement casing 120 and the frame part 141, and has a shape extending along the outer edge of the frame part 141.

The presser claws 1412 of the frame part 141 receive a reaction from the coupling part 132 by inserting the presser claws 1412 into the respective claw holes 1323, and the frame part 141 is pressed against the side face of the measurement casing 120. Further, the protective cover 121 is fixed to the measurement casing 120 by screwing screws with the screw receiving parts 1322 through screw holes of the screw mount parts 1411 with the screw mount parts 1411 facing the respective screw receiving parts 1322.

<Optical Component 140>

Figure 7:
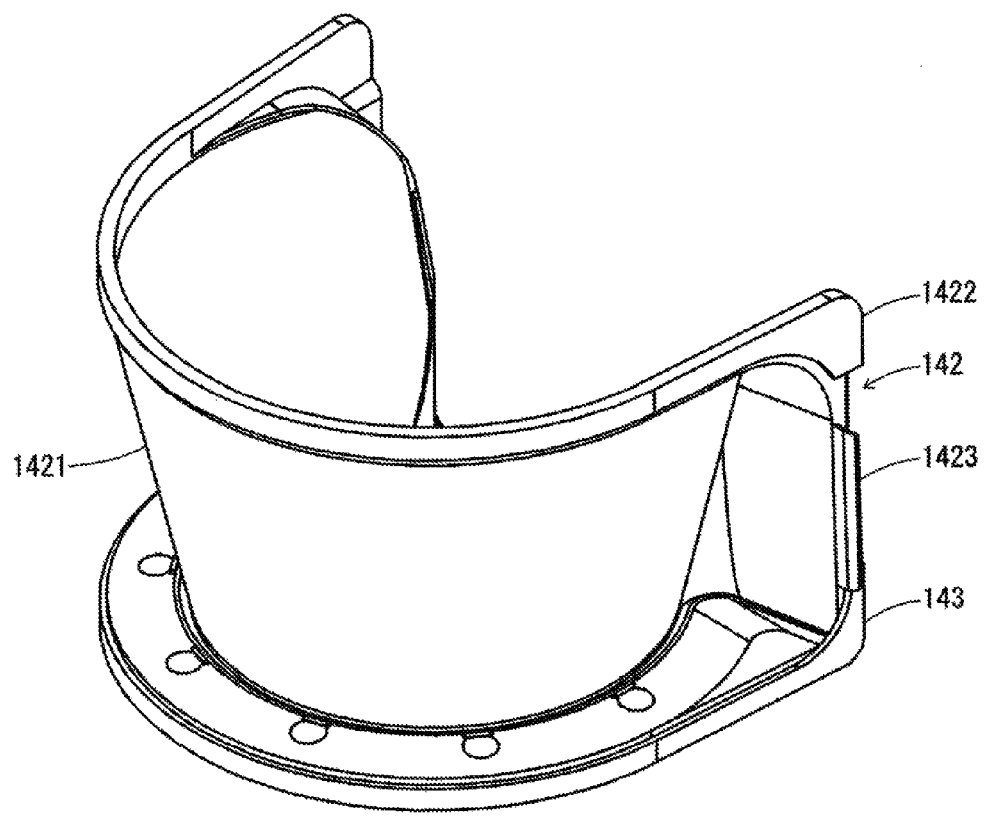
FIG. 7 is a perspective view illustrating a configuration example of an optical component.

FIG. 7 is a perspective view illustrating a configuration example of an optical component 140. The optical component 140 includes the window part 142 and the base part 143, and is formed separately from the frame part 141. A cross section of the window part 142 taken along a plane (horizontal plane) perpendicular to the rotation axis of the optical rotator 30 has a circular arc shape on the front side with respect to the rotation axis and is curved inward on the rear side with respect to the rotation axis. For example, the rear end of the window part 142 extends around to the back of a passage region of the optical rotator 30 when viewed from the front side. That is, the cross section of the window part 142 has a circular arc shape having a central angle larger than 180°.

The window part 142 includes an optical surface 1421 which is inclined in a conical surface shape having a vertex on the lower side, an attachment part 1422 which is attached to the frame part 141, and a coupling part 1423 which couples the rear end of the optical surface 1421 and the rear end of the attachment part 1422 to the rear end of the base part 143.

The optical surface 1421 is an outer peripheral face of the window part 142, and the shape thereof corresponds to the shape of the window part 142 in which the diameter of the cross section is monotonously reduced with a substantially constant inclination as separating from the upper end of the window part 142. That is, the cross section of the window part 142 taken along a plane including the rotation axis has a linear shape.

The attachment part 1422 is a part which has a shape extending along the upper end of the optical surface 1421, and has a circular arc shape on the front side with respect to the rotation axis of the optical rotator 30 and a linear shape on the rear side with respect to the rotation axis. The coupling part 1423 is a plate-like part perpendicular to the front-rear direction.

The base part 143 is a horseshoe-shaped part which is open rearward. The lower end of the window part 142 is joined to the inner peripheral edge of the upper face of the base part 143. Further, the outer peripheral edge face of the base part 143 is joined to the inner peripheral face of the frame part 141.

The window part 142 is formed separately from the base part 143. For example, the window part 142 is a resin molded article which is molded by pressing using a metal mold, and the optical surface 1421, the attachment part 1422 and the coupling part 1423 are integrally formed. The window part 142 and the base part 143 are both formed of a light transmissive resin material. The window part 142 and the base part 143 are joined to each other with an adhesive.

<Frame Part 141>

Figure 8:
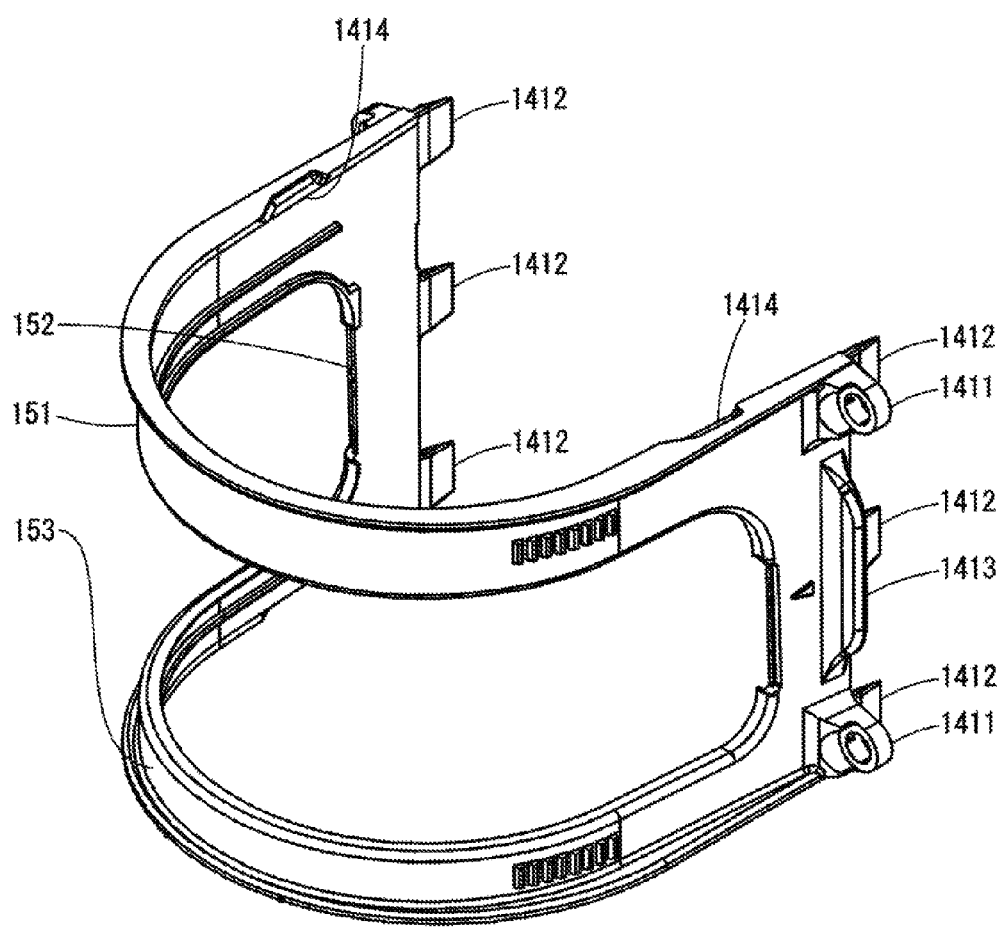
FIG. 8 is a perspective view illustrating a configuration example of a frame part.

FIG. 8 is a perspective view illustrating a configuration example of the frame part 141. The frame part 141 includes an upper frame 151, coupling frames 152, and a lower frame 153. The upper frame 151 is a part extending along the outer edge of the canopy part 131.

The lower frame 153 is a part extending along the outer edge of the bottom part 133. Both the upper frame 151 and the lower frame 153 have a circular arc shape on the front side with respect to the rotation axis of the optical rotator 30 and a linear shape on the rear side with respect to the rotation axis.

Each of the coupling frame 152 is a part which extends along the outer edge of the coupling part 132 and couples the rear end of the upper frame 151 to the rear end of the lower frame 153. The coupling frames 152 are formed at the right and left sides of the upper frame 151 and the lower frame 153. The screw mount parts 1411, the presser claws 1412, and the grip parts 1413 are disposed on the coupling frames 152.

The upper frame 151 and the lower frame 153 include recesses 1414 which are engaged with stoppers for restricting the movement of the protective cover 121 in the front direction. Each of the recesses 1414 is an engagement hole which faces the side face of the measurement casing 120, and is recessed in the right-left direction. The recesses 1414 are formed on the right upper end of the upper frame 151, the left upper end of the upper frame 151, the right lower end of the lower frame 153, and the left lower end of the lower frame 153.

The frame part 141 is a resin molded article which is molded by pressing using a metal mold, and the upper frame 151, the coupling frame 152 and the lower frame 153 are integrally formed. Further, the frame part 141 is joined to the window part 142 and the base part 143 of the optical component 140 with an adhesive. That is, the base part 143 is joined to the lower end of the window part 142 with an adhesive and joined to the lower frame 153 with an adhesive.

Figure 9:
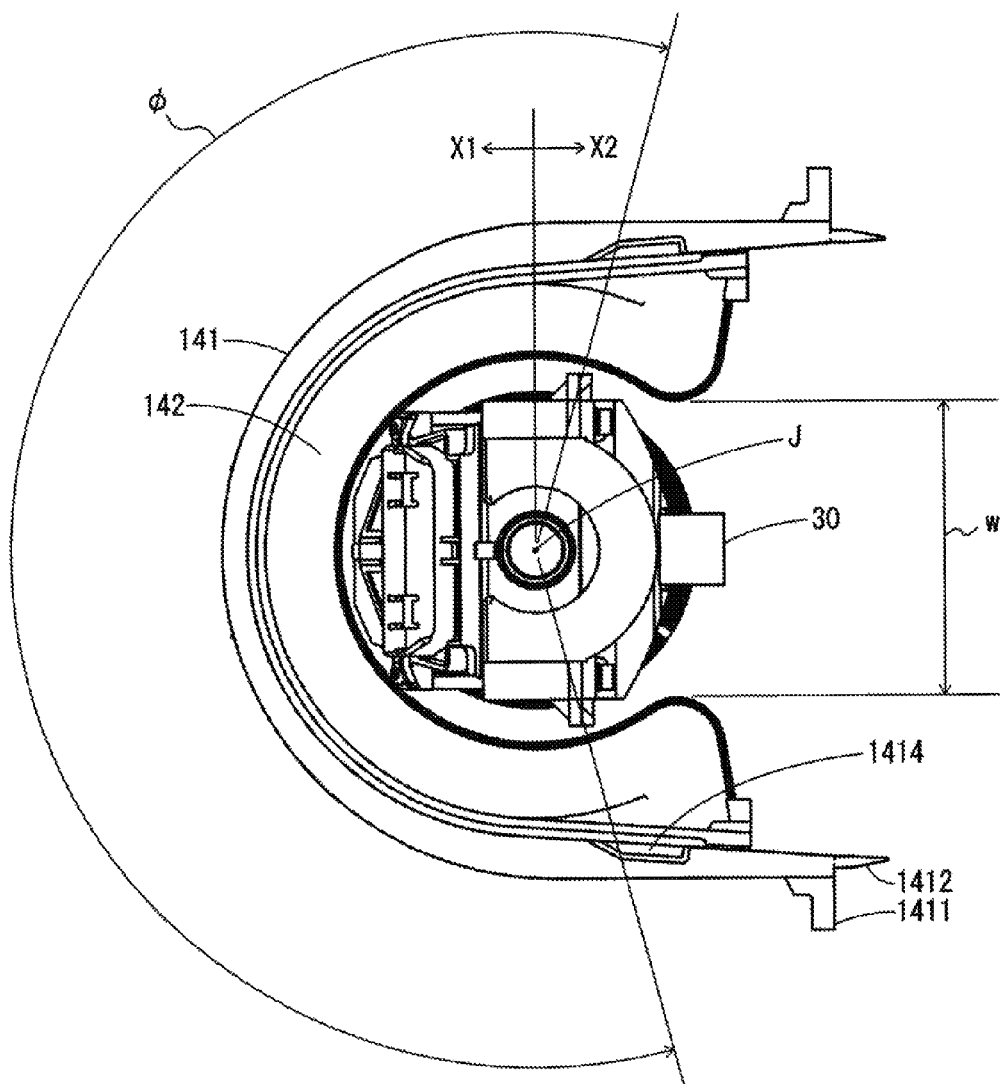
FIG. 9 is a diagram illustrating the protective cover and an optical rotator viewed from the upper side.

FIG. 9 is a diagram illustrating the protective cover 121 and the optical rotator 30 viewed from the upper side. The optical rotator 30 rotates around a rotation axis J. The rotation axis J is a virtual central axis extending in the up-down direction. The cross section of the window part 142 of the protective cover 121 taken along the horizontal plane has a curved shape extending around to the back of the optical rotator 30, that is, a circular arc shape having a central angle around the rotation axis J larger than 180°.

In this example, the central angle is approximately 270° near the lower end of the window part 142 and approximately 220° to 230° near the upper end of the window part 142. Such a curved shape of the window part 142 enables uniform optical performance to be obtained for a view angle φ of 180° or more around the rotation axis J.

The view angle φ is represented by the central angle around the rotation axis J and indicates the largest range that can be monitored by performing scanning with detection light DL in the circumferential direction. For example, when a range with a central angle of −5° to 185° based on a Y axis in the right-left direction is monitored, the view angle φ is 190°. On the other hand, the frame part 141 of the protective cover 121 has a circular arc shape on a front side X1 with respect to the rotation axis J and a linear shape on a rear side X2 with respect to the rotation axis J.

The diameter of the cross section of the window part 142 is larger than twice the distance between the rotation axis J and the farthest part of the optical rotator 30 at any position in the up-down direction. Thus, the optical rotator 30 can be rotated without interference with the window part 142. On the other hand, the length in the right-left direction of an opening of the window part 142 on the rear side X2, that is, an opening width w is shorter than twice the distance between the rotation axis J and the farthest part of the optical rotator 30 at a certain position in the up-down direction. Thus, when the protective cover 121 is detached from the measurement casing 120, the window part 142 may make contact with the optical rotator 30 depending on the orientation of the optical rotator 30.

In view of this, in the safety scanner 10 according to the present embodiment, the width of the measurement casing 120 in the right-left direction is reduced by bringing the window part 142 as close as possible to the optical rotator 30 and the stoppers are formed on the measurement casing 120 to prevent the window part 142 from making contact with the optical rotator 30 when the protective cover 121 is detached.

<Stopper for Protective Cover>

Figure 10:
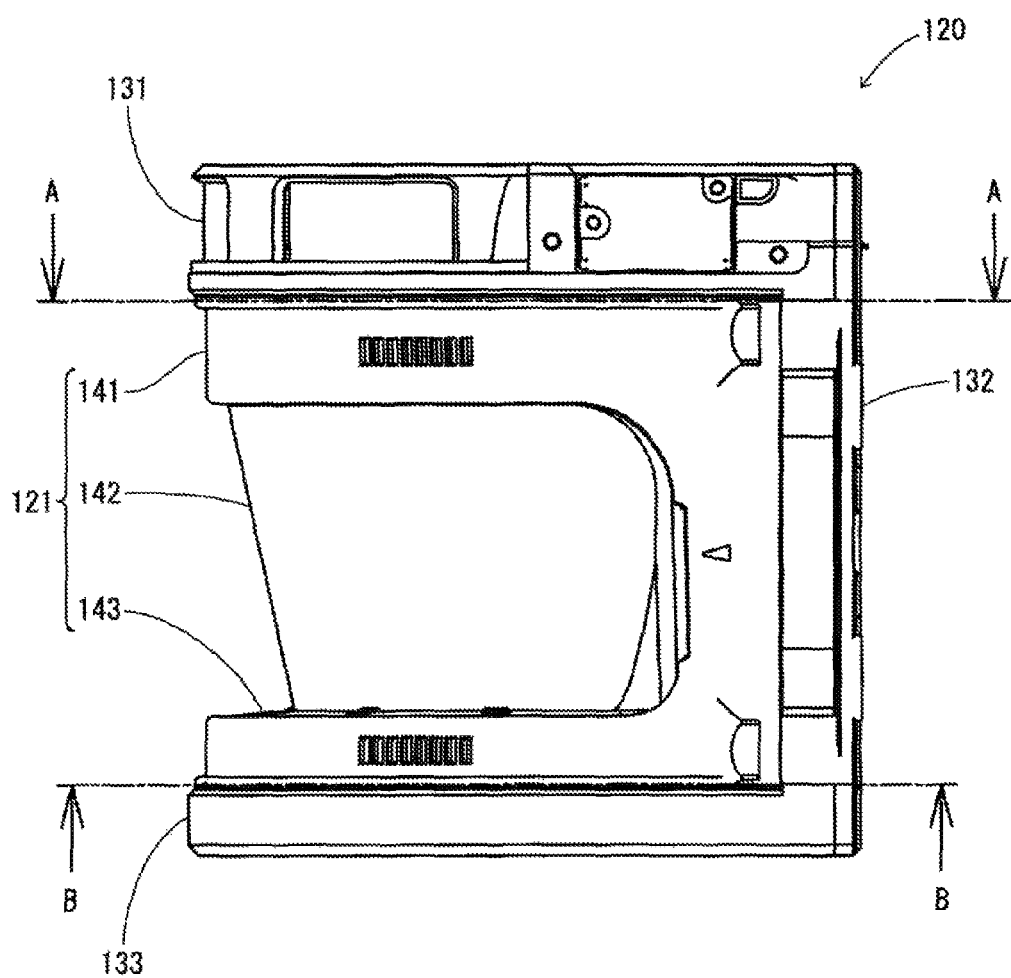
FIG. 10 is a side view illustrating the measurement casing viewed from the right side.
Figure 11:
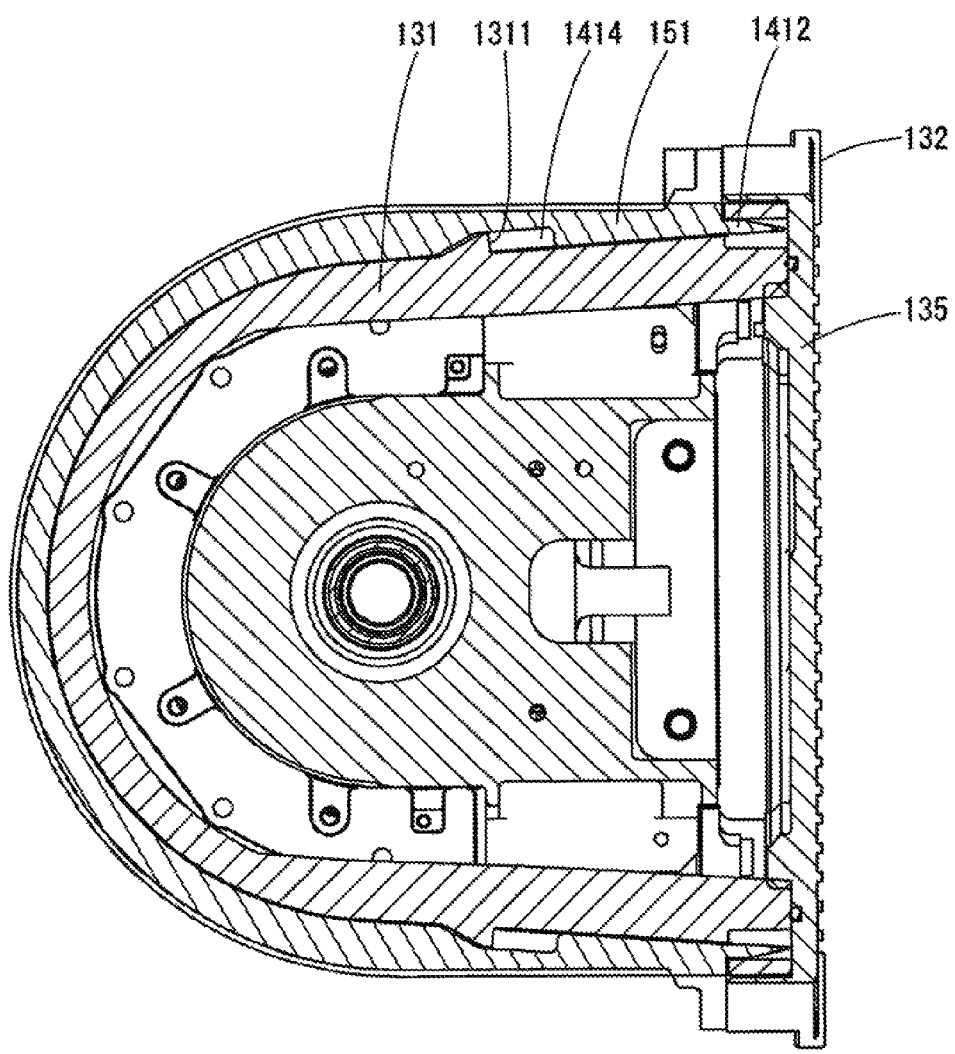
FIG. 11 is a sectional view illustrating a cross section of the measurement casing of FIG. 10 taken along line A-A.
Figure 12:
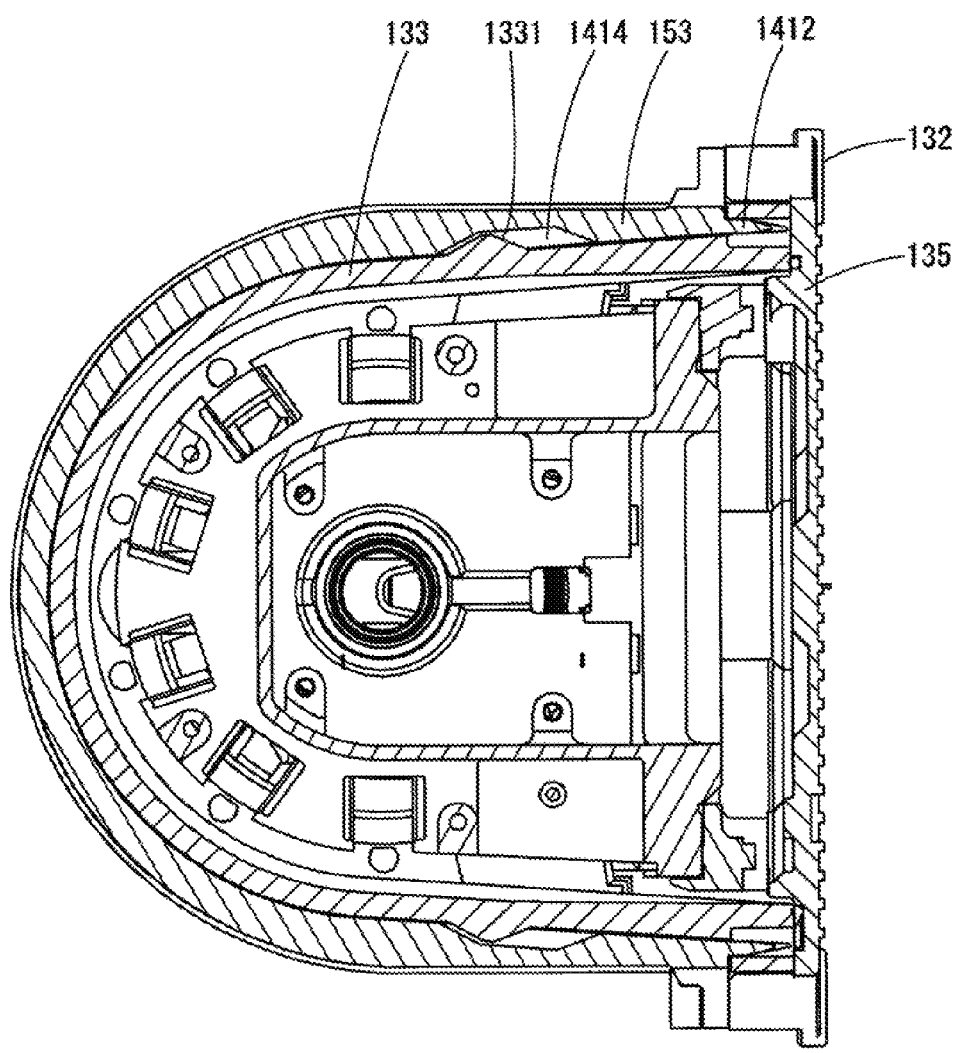
FIG. 12 is a sectional view illustrating a cross section of the measurement casing of FIG. 10 taken along line B-B.

FIG. 10 is a side view illustrating the measurement casing 120 with the protective cover 121 attached viewed from the right side. FIG. 11 is a sectional view illustrating a cross section of the measurement casing 120 of FIG. 10 taken along line A-A. FIG. 12 is a sectional view illustrating a cross section of the measurement casing 120 of FIG. 10 taken along line B-B. FIG. 11 and FIG. 12 illustrate cross sections viewed in the direction of arrows in FIG. 10.

The coupling part 132 is open rearward, and the back plate 135 for closing the opening is attached to the coupling part 132. The canopy part 131 is provided with stoppers 1311 for restricting the movement of the protective cover 121 in the front direction (forward direction). The stoppers 1311 are projections projecting in the right-left direction from the side faces of the canopy part 131, and formed on the right side face and the left side face of the canopy part 131.

Each of the stoppers 1311 is engaged with the corresponding recess 1414 formed on the upper frame 151 of the frame part 141. A cross section of the stopper 1311 taken along the horizontal plane has a rectangular shape, has a larger inclination in an inclined surface on the rear side than in an inclined surface on the front side, and intersects the side face of the canopy part 131 at a substantially right angle.

The bottom part 133 is provided with stoppers 1331 for restricting the movement of the protective cover 121 in the front direction. The stoppers 1331 are projections projecting in the right-left direction from the side faces of the bottom part 133, and formed on the right side face and the left side face of the bottom part 133.

Each of the stoppers 1331 is engaged with the corresponding recess 1414 formed on the lower frame 153 of the frame part 141. A cross section of the stopper 1331 taken along the horizontal plane has a rectangular shape, and an inclined surface on the front side and an inclined surface on the rear side have substantially the same inclination.

Figure 13A:
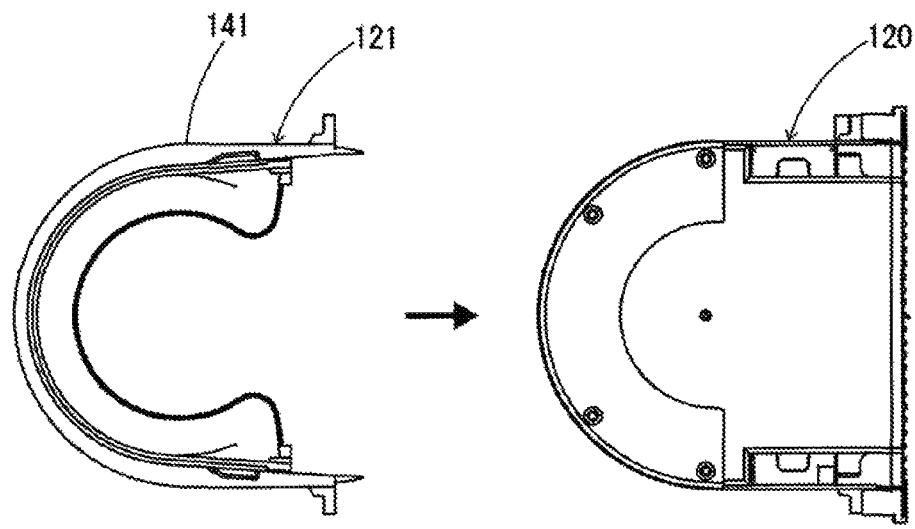
FIGS. 13A and 13B are explanatory diagrams schematically illustrating a state in which the protective cover is attached to and detached from the measurement casing.
Figure 13B:
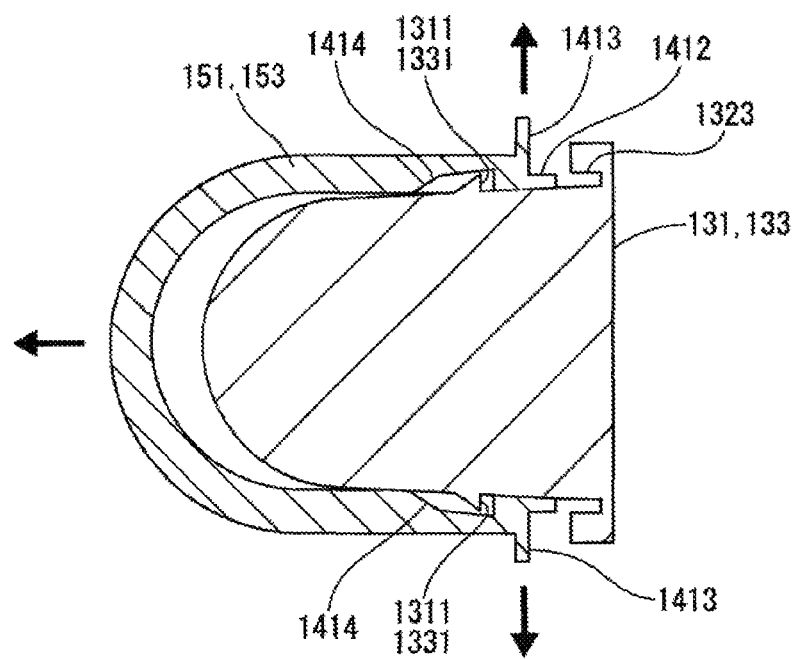

FIGS. 13A and 13B are explanatory diagrams schematically illustrating a state in which the protective cover 121 is attached to and detached from the measurement casing 120. FIG. 13A illustrates a case in which the protective cover 121 is attached to the measurement casing 120 from the front side, and FIG. 13B illustrates a case in which the protective cover 121 is detached from the measurement casing 120 to the front side.

The protective cover 121 is attached to the measurement casing 120 by moving the protective cover 121 rearward relative to the measurement casing 120 so as to slide the upper frame 151 and the lower frame 153 of the frame part 141 along the side face of the canopy part 131 and the side face of the bottom part 133.

On the other hand, when the protective cover 121 is detached from the measurement casing 120, it is necessary to expand the frame part 141 in the right-left direction by pulling the grip parts 1413 of the frame part 141 in the right-left direction. First, when the protective cover 121 is moved forward relative to the measurement casing 120 to pull out the presser claws 1412 of the frame part 141 from the claw holes 1323 of the coupling part 132, the rear ends of the recesses 1414 come into contact with the stoppers 1311 of the canopy part 131 and the stoppers 1331 of the bottom part 133 to prevent the movement of the protective cover 121 in the front direction.

Then, the grip parts 1413 of the frame part 141 are grasped and pulled in the right-left direction to expand the frame part 141 in the right-left direction, so that the opening on the rear side of the window part 142 is expanded in the right-left direction. When the frame part 141 is slid forward in this state, the rear ends of the recesses 1414 ride on the front ends of the stoppers 1311 and 1331.

A projection length of the stoppers 1311 and 1331 is formed in such a manner that the opening width w on the rear end of the window part 142 becomes wider than the width of the passage region of the optical rotator 30 when the engagement with the recesses 1414 is released. When the protective cover 121 is detached from the measurement casing 120, the opening on the rear side of the window part 142 is always forcibly expanded in the right-left direction. Thus, the contact between the window part 142 and the optical rotator 30 can be prevented regardless of the orientation of the optical rotator 30.

<Transmittance Monitoring Mechanism 40>

Figure 5:
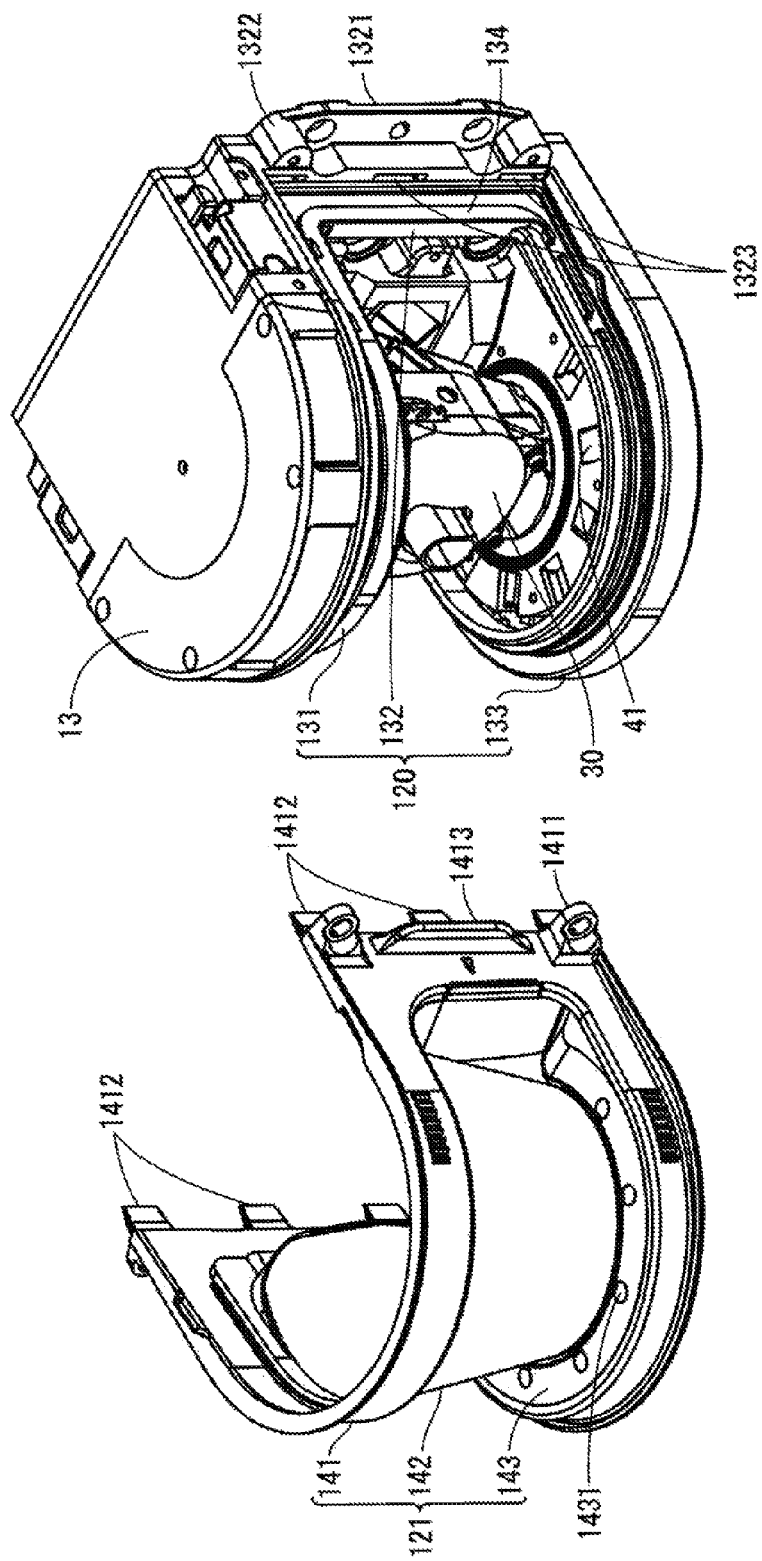
FIGS. 5A and 5B are perspective views illustrating a case in which a protective cover is detached from a measurement casing in FIG. 4.
Figure 6:
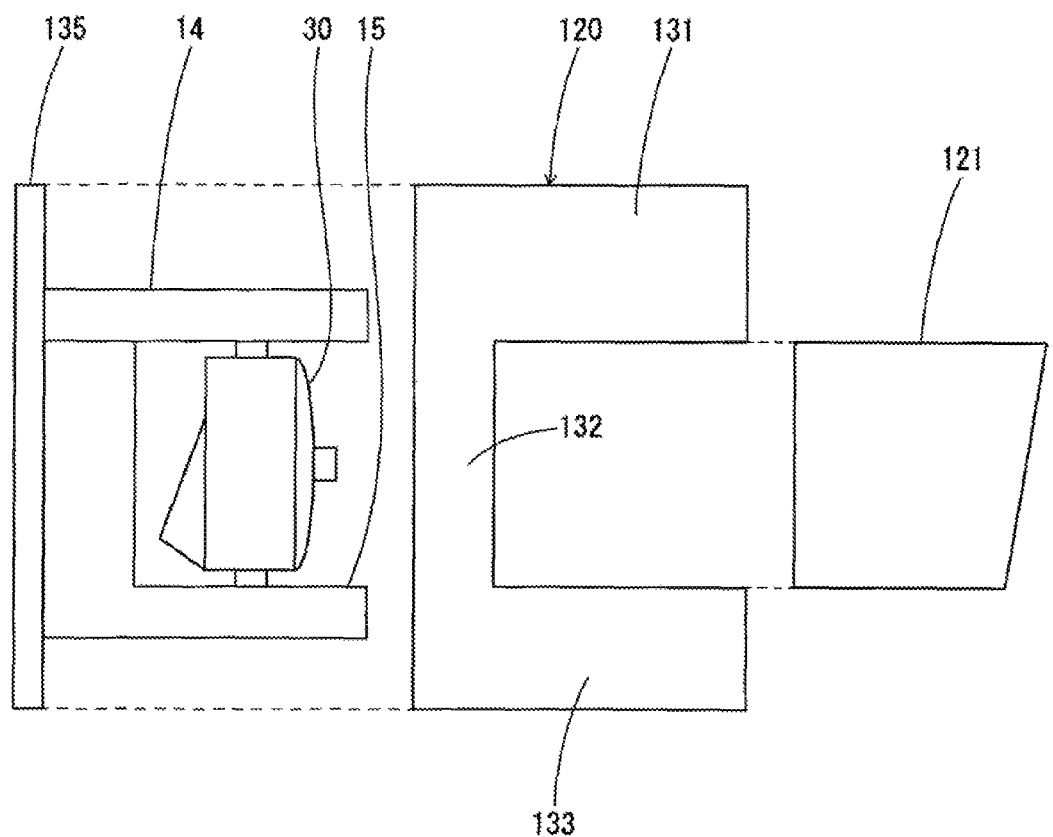
FIG. 6 is an explanatory diagram illustrating the measurement unit of FIG. 4 in a developed manner.
Figure 14:
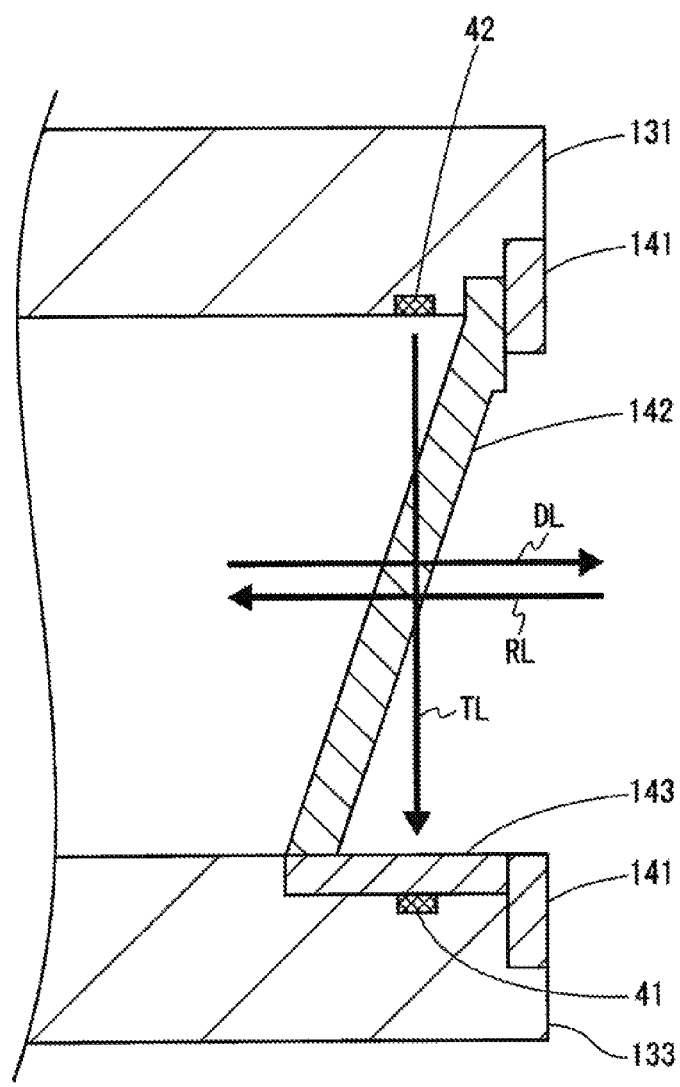
FIG. 14 is an explanatory diagram schematically illustrating a configuration example of a transmittance monitoring mechanism for monitoring the transmittance of a window part of FIG. 5.

FIG. 14 is an explanatory diagram schematically illustrating a configuration example of a transmittance monitoring mechanism 40 for monitoring the transmittance of the window part 142 of FIG. 5. FIG. 14 illustrates a part of the cross section of the measurement casing 120 taken along a vertical plane that includes the rotation axis J and is perpendicular to the front-rear direction. The transmittance monitoring mechanism 40 is a monitor device which optically monitors the transmittance of the window part 142 to sense dirt or damage, and includes a light receiving element 41, a light emitting element 42 and a monitoring control part (not illustrated).

The window part 142 of the protective cover 121 transmits detection light DL from the light emitting light source outward in the radial direction from the rotation axis J and transmits reflected light RL from an object inward in the radial direction. The window part 142 is inclined in such a manner that the distance to the rotation axis J is monotonously reduced with a constant inclination as separating from the upper end toward the lower side. The window part 142 inclined in this manner can prevent regular reflection of the detection light DL. Light for transmittance monitoring passes through the window part 142 toward the lower side.

The light emitting element 42 is a light emitting element which emits light for detection toward the window part 142 and disposed on the outer edge of the canopy part 131. For example, a light emitting diode (LED) is used as the light emitting element 42. The light emitting element 42 is disposed with a light emitting surface facing downward.

The light receiving element 41 is a photoelectric conversion element which receives transmitted light TL that has passed through the window part 142 and generates a light receiving signal, and disposed on the outer edge of the bottom part 133. For example, a photodiode (PD) is used as the light receiving element 41. The light receiving element 41 is disposed with a light receiving surface facing upward so as to face the light emitting surface of the light emitting element 42. The transmitted light TL that has passed through the window part 142 is received by the light receiving element 41 through the base part 143.

The monitoring control part controls emission and reception of light, obtains the transmittance of the window part 142 on the basis of the light receiving signal from the light receiving element 41, compares the transmittance with a determination threshold to determine the presence or absence of a malfunction, and outputs the determination result as a sensing signal. The transmittance is obtained, for example, on the basis of a receiving amount of the transmitted light TL.

<Optical Rotator 30>

Figure 15A:
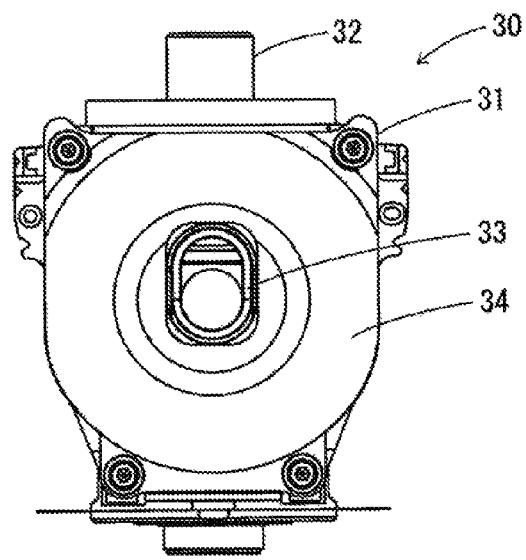
FIGS. 15A to 15C are diagrams illustrating a configuration example of the optical rotator of FIG. 5.
Figure 15B:
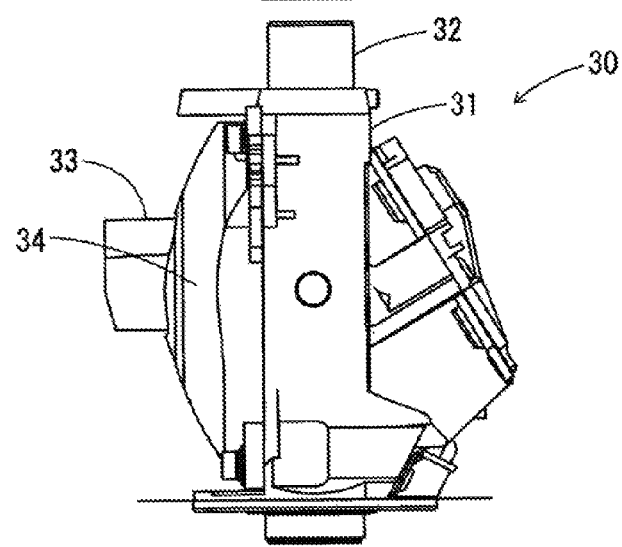
Figure 15C:
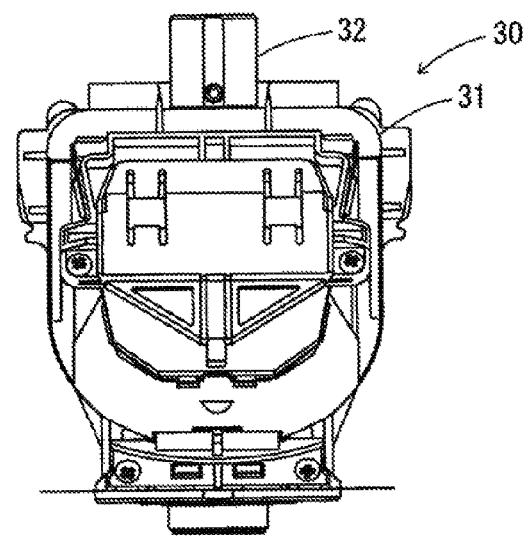
Figure 16:
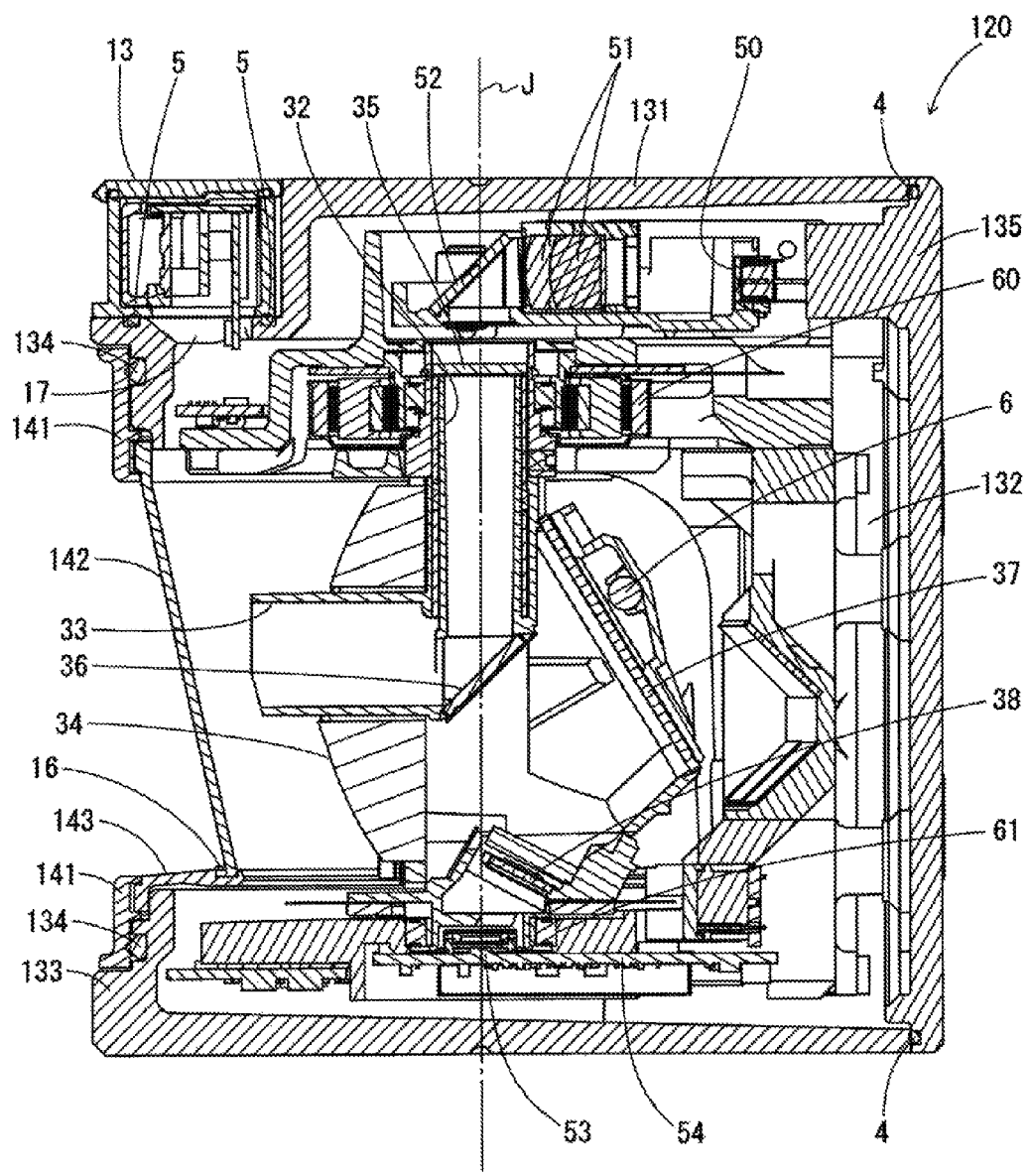
FIG. 16 is a sectional view illustrating a cross section of the measurement casing taken along a vertical plane including a rotation axis.

FIGS. 15A to 15C are diagrams illustrating a configuration example of the optical rotator 30 of FIG. 5. FIG. 15A illustrates a front face of the optical rotator 30, FIG. 15B illustrates a right side face of the optical rotator 30, and FIG. 15C illustrates a back face of the optical rotator 30. FIG. 16 is a sectional view illustrating a cross section of the measurement casing 120 taken along a vertical plane that includes the rotation axis J and is perpendicular to the right-left direction.

The optical rotator 30 includes an optical base frame 31, body tubes 32, 33, a receiver lens 34, a shield plate 35, an emitter mirror 36, a receiver mirror 37, and a cylindrical lens 38.

The light emitting light source 50, a condenser lens 51, a turning mirror 52, and a motor part 60 are disposed inside the canopy part 131. The light receiving element 53, a light receiving board 54, and a bearing 61 are disposed inside the bottom part 133.

The optical base frame 31 is a holding member which holds the body tubes 32, 33, the receiver lens 34, the shield plate 35, the emitter mirror 36, the receiver mirror 37, and the cylindrical lens 38. The light emitting light source 50 includes a light emitting element such as a laser diode (LD) or a light emitting diode (LED) and generates detection light DL. The light emitting light source 50 is disposed with the light emitting surface facing forward.

The condenser lens 51 is an optical member for concentrating the detection light DL from the light emitting light source 50. The detection light DL is converted into substantially parallel light by the condenser lens 51. The turning mirror 52 is a flat plate-like reflecting mirror which reflects the detection light DL incident from the rear side through the condenser lens 51 downward. The turning mirror 52 is tilted by 45° with respect to the rotation axis J. That is, the tilt angle of the turning mirror 52 with respect to the rotation axis J is approximately 45°. The body tube 32 is a tubular optical guide member which has a central axis coincident with the rotation axis J and extends in the up-down direction, and guides the detection light DL reflected by the turning mirror 52 downward.

The emitter mirror 36 is a flat plate-like reflecting mirror which turns the detection light DL from the light emitting light source 50 by 90°. The emitter mirror 36 is tilted by 45° with respect to the rotation axis J and reflects the detection light DL incident from the upper side through the turning mirror 52 in the horizontal direction. The tilt angle of the emitter mirror 36 with respect to the rotation axis J is approximately 45°.

The body tube 33 is a tubular optical guide member extending in the horizontal direction and guides the detection light DL reflected by the emitter mirror 36 in the horizontal direction. The shield plate 35 is a protective cover which closes an opening of the body tube 32 and includes a light transmissive flat plate-like optical member. The shield plate 35 is disposed on the upper end of the body tube 32. The detection light DL reflected by the turning mirror 52 enters the emitter mirror 36 through the shield plate 35.

The receiver lens 34 is an optical member which concentrates reflected light RL from an object. For example, the receiver lens 34 is a plano-convex lens and disposed with the rotation symmetry axis aligned with the horizontal direction. The body tube 33 penetrates the receiver lens 34 and is disposed with the central axis substantially coincident with the rotation symmetry axis of the receiver lens 34.

The receiver mirror 37 is a flat plate-like plane mirror which reflects the reflected light RL transmitted through the receiver lens 34 toward the light receiving element 53. The receiver mirror 37 is disposed offset to the side opposite to the emission side of the detection light DL with respect to the rotation axis J and has a tilt angle larger than 45°. For example, the tilt angle of the receiver mirror 37 with respect to the rotation axis J is approximately 60°. Further, the entire reflecting surface of the receiver mirror 37 is located on the rear side with respect to the rotation axis J.

The optical rotator 30 is configured in such a manner that the central axis of the body tubes 33 is made substantially coincident with the rotation symmetry axis of the receiver lens 34 so that an emission optical axis of the detection light DL is substantially the same as an incident optical axis of the reflected light RL.

The light receiving element 53 is a photoelectric conversion element which receives the reflected light RL from an object within the detection area through the optical rotator 30 and generates a light receiving signal. For example, a photodiode (PD) is used as the light receiving element 53. The light receiving element 53 includes a light receiving surface which is perpendicular to the rotation axis J and is disposed on the rotation axis J with the light receiving surface facing upward. The rotation axis J penetrates the light receiving surface of the light receiving element 53. The light receiving board 54 is a circuit board on which a circuit element such as the light receiving element 53 is formed.

The cylindrical lens 38 is an optical member which forms an image of the reflected light RL reflected by the receiver mirror 37 on the light receiving surface of the light receiving element 53. The cylindrical lens 38 is a condenser lens for focusing position adjustment for correctly forming an image of the reflected light RL which is off-centered in the up-down direction on the light receiving surface of the light receiving element 53 and includes a cylindrical surface curved in the up-down direction. The cylindrical lens 38 is disposed with the central axis of the cylindrical surface horizontal.

The motor part 60 includes an electric motor which rotates the optical rotator 30 around the rotation axis J and a bearing which rotatably supports the upper end of the optical rotator 30 around the rotation axis J. The bearing 61 rotatably supports the lower end of the optical rotator 30 around the rotation axis J.

An adhesive part 16 to be adhered to the base part 143 is formed on the lower end of the window part 142. For example, the adhesive part 16 is formed along the lower end of the window part 142, and a part of the window part 142 is welded to the base part 143.

A packing 4 is disposed on a joint between the back plate 135 and the measurement casing 120. The packing 4 is a seal member for sealing and disposed along the outer edge of the back plate 135. Further, a packing 5 is disposed on a joint between the indicator lamp module 13 and the canopy part 131. The packing 5 is a seal member for sealing and surrounds a through hole 17 for wiring formed on the canopy part 131. A communication line with the fixed cameras 122, 123 and a power line to the indicator lamp 124 are disposed in the through hole 17.

The optical rotator 30 is provided with a balancer 6. The balancer 6 is a weight member for adjusting a balance of rotation moment. In the optical rotator 30, the balance of rotation moment is adjusted by disposing the receiver lens 34 and the receiver mirror 37 on the opposite sides across the rotation axis J. The balancer 6 is provided when the balance of rotation moment cannot be adjusted only by the receiver lens 34 and the receiver mirror 37. The balancer 6 is disposed on the back side of the receiver mirror 37.

Figure 17:
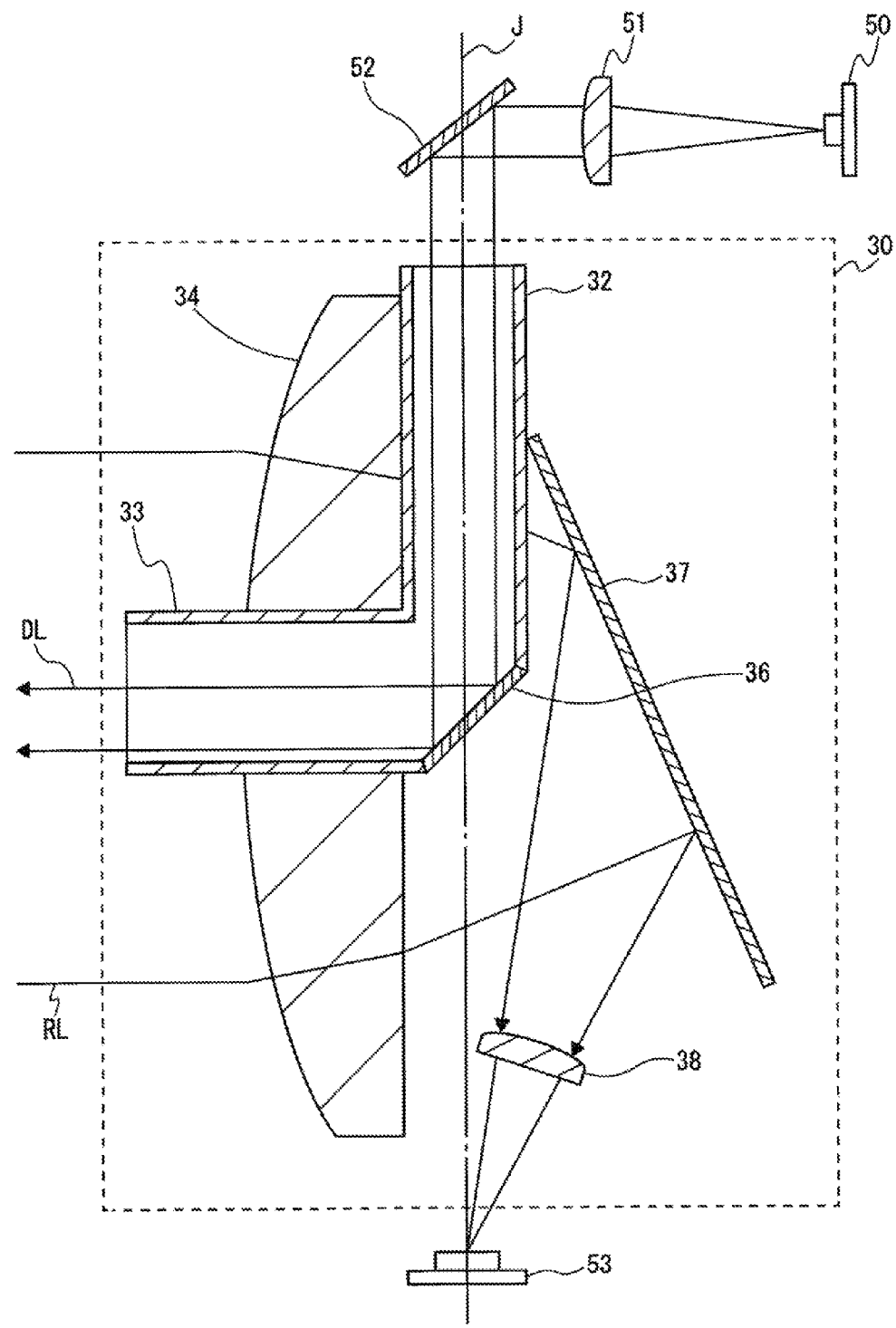
FIG. 17 is an explanatory diagram schematically illustrating an optical system of FIG. 16.

FIG. 17 is an explanatory diagram schematically illustrating an optical system of FIG. 16. The optical system includes the body tubes 32, 33, the receiver lens 34, the emitter mirror 36, the receiver mirror 37, the cylindrical lens 38, the light emitting light source 50, the condenser lens 51, the turning mirror 52, and the light receiving element 53.

The detection light DL emitted forward from the light emitting light source 50 enters the turning mirror 52 through the condenser lens 51 and is reflected downward. The emitter mirror 36 of the optical rotator 30 reflects the detection light DL incident from the upper side in the horizontal direction.

A beam of the detection light DL incident on the emitter mirror 36 can be thinned by using the condenser lens 51. The height in the up-down direction of the canopy part 131 can be reduced by using the turning mirror 52. Further, a beam propagating in the up-down direction can be obtained by disposing the reflecting surface of the turning mirror 52 on the rotation axis J.

The reflected light RL horizontally incident on the receiver lens 34 of the optical rotator 30 passes through the receiver lens 34 and enters the receiver mirror 37. The receiver mirror 37 reflects the horizontally incident reflected light RL toward the light receiving element 53. The receiver mirror 37 is disposed so as not to overlap the emitter mirror 36 in the direction of the rotation axis J (up-down direction). The cylindrical lens 38 is located between the receiver mirror 37 and the light receiving element 53 and forms an image of the reflected light RL reflected by the receiver mirror 37 on the light receiving surface of the light receiving element 53.

The reflected light RL diffused in the up-down direction can also be received by making the emission optical axis of the detection light DL coincident with the incident optical axis of the reflected light RL. Further, the receiver lens 34 can be downsized. When the receiver mirror 37 is disposed offset, the receiver lens 34 can be disposed close to the rotation axis J. Thus, the rotation radius of the optical rotator 30 can be reduced.

The reflected light RL from the receiver mirror 37 can be received regardless of the orientation of the optical rotator 30 by disposing the light receiving surface of the light receiving element 53 on the rotation axis J. An image of the reflected light RL which is off centered in the up-down direction can be correctly formed on the light receiving surface of the light receiving element 53 by using the cylindrical lens 38.

The window part 142 of the protective cover 121 has a linear shape in the up-down direction and a circular arc shape in the scanning direction of the detection light DL, and has a lens effect. The cylindrical lens 38 is capable of reducing variations in the focusing position of the reflected light RL caused by the optical property anisotropy of the protective cover 121.

Figure 18A:
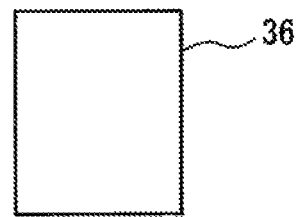
FIGS. 18A and 18B are front views illustrating an emitter mirror and a receiver mirror of FIG. 16.
Figure 18B:
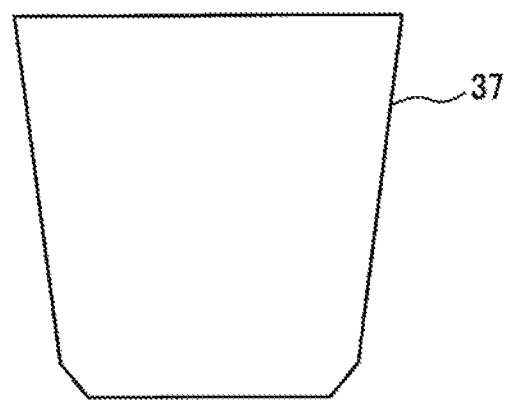

FIGS. 18A and 18B are front views illustrating the emitter mirror 36 and the receiver mirror 37 of FIG. 16. FIG. 18A illustrates the emitter mirror 36, and FIG. 18B illustrates the receiver mirror 37. The emitter mirror 36 includes a rectangular flat plate. On the other hand, the receiver mirror 37 includes an isosceles trapezoidal flat plate whose lower base is shorter than the upper base.

Since the receiver mirror 37 is disposed with the reflecting surface tilted to the lower side, the receiver mirror 37 becomes away from the rotation axis J as separating from the upper end in the up-down direction. The isosceles trapezoidal shape of the receiver mirror 37 reduces the size of a part far from the rotation axis J, which enables the rotation radius of the optical rotator 30 to be further reduced.

In the safety scanner 10 according to the present embodiment, the cross section of the window part 142 of the protective cover 121 taken along the plane perpendicular to the rotation axis J of the optical rotator 30 has a curved shape extending around to the back of the optical rotator 30. Thus, uniform optical performance can be obtained for a view angle of 180° or more. Therefore, a detectable distance can be increased.

When the protective cover 121 is detached from the measurement casing 120, the frame part 141 is expanded in the right-left direction. Thus, the protective cover 121 can be detached without interference between the window part 142 and the optical rotator 30. Further, the structure that prevents interference with the optical rotator 30 using the expansion of the frame part 141 in the right-left direction produced by the rear ends of the recesses 1414 riding on the stoppers 1311 and 1331 is employed. Thus, an increase in the size of the safety scanner 10 can be suppressed.

Further, the frame part 141, the window part 142, and the base part 143 can be individually molded. Thus, the protective cover 121 can be easily manufactured. Further, the window part 142 and the frame part 141 may be formed of different materials. For example, the window part 142 is formed of a material having a higher transmittance than the frame part 141. On the other hand, the frame part 141 is formed of a material having a higher stiffness than the window part 142.

Further, it is possible to improve the optical performance of the optical component 140 and to make the optical component 140 less likely to have a parting line by forming the frame part 141 separately from the optical component 140. Further, it is possible to firmly fix the protective cover 121 to the measurement casing 120 and to improve a water proofing performance by forming the frame part 141 and the optical component 140 as separate components.

The focusing position in the up-down direction can be adjusted by the cylindrical lens 38. Thus, it is possible to reduce focus shift depending on the position on the light receiving surface of the light receiving element 53 caused by a large difference in the curvature of the window part 142 between the scanning direction of the detection light DL and the up-down direction. The size of the cylindrical lens 38 can be reduced by disposing the cylindrical lens 38 on the downstream side with respect to the receiver lens 34. Thus, the rotation radius of the optical rotator 30 can be further reduced.

According to the present embodiment, the receiver mirror 37 is disposed offset to the side opposite to the emission side of the detection light DL, and the tilt angle with respect to the rotation axis J is larger than 45°. Thus, the rotation radius of the optical rotator 30 can be reduced compared to the case in which the receiver mirror 37 is disposed on the rotation axis J.

When the receiver lens 34 and the receiver mirror 37 are disposed separately from each other, the receiver mirror 37 is disposed offset. Thus, it is possible to bring the receiver lens 34 closer to the rotation axis J. Therefore, an increase in the size of the device can be suppressed. Further, the receiver mirror 37 is disposed on the downstream side with respect to the receiver lens 34, which enables the size of the receiver mirror 37 to be reduced.

Further, the emission optical axis of the detection light DL and the incident optical axis of the reflected light RL can be made substantially coincident with each other without disposing the receiver mirror 37 on the rotation axis J. Thus, it is possible to prevent the shapes of the emitter mirror 36 and the receiver mirror 37 from becoming complicated. In particular, the receiver mirror 37 and the emitter mirror 36 can be formed as separate members, which enables the emitter mirror 36 and the receiver mirror 37 to be easily manufactured.

Although, in the present embodiment, there is described an example in which the safety scanner 10 is a separate type safety sensor in which display unit 11 can be separated from the measurement unit 12, the present invention is also applicable to a non-separate type safety sensor in which the display unit 11 cannot be separated from the measurement unit 12. For example, the present invention is also applicable to a safety scanner that includes the display panel 111, the operation key 113, the cable connection port 114, and the output port for a sensing signal which are disposed on the canopy part 131, the coupling part 132, or the bottom part 133.

Although, in the present embodiment, there is described an example in which the frame part 141, the window part 142, and the base part 143 are joined to each other with an adhesive, the configuration of the protective cover 121 of the present invention is not limited thereto. For example, the frame part 141 and the window part 142 may be integrally formed as one resin molded article, and the resin molded article and the base part 143 may be joined together with an adhesive. Alternatively, the window part 142 and the base part 143 may be integrally formed as one resin molded article, and the resin molded article and the frame part 141 may be joined together with an adhesive. Alternatively, the base part 143 and the frame part 141 may be integrally formed as one resin molded article, and the resin molded article and the window part 142 may be joined together with an adhesive.

Although, in the present embodiment, there is described an example in which the stoppers 1311 and 1331 are formed on the canopy part 131 and the bottom part 133, the configuration of the stoppers for restricting the movement of the protective cover 121 of the present invention is not limited thereto. For example, the frame part 141 of the protective cover 121 includes stoppers for restricting the movement in the front direction with respect to the measurement casing 120. The stoppers have a shape projecting in the right-left direction from the inner face of the protective cover, face the left side face and the right side face of the canopy part 131 or the bottom part 133, and are engaged with recesses formed on the left side face and the right side face of the canopy part 131 or the bottom part 133.

According to such a configuration, the stoppers of the frame part 141 have a shape projecting in the right-left direction. Thus, in order to detach the protective cover 121 from the measurement casing 120, it is necessary to release the engagement between the stoppers and the recesses of the canopy part 131 or the bottom part 133 by expanding the frame part 141 in the right-left direction. That is, when the protective cover 121 is detached from the measurement casing 120, the frame part 141 is expanded in the right-left direction. Thus, the protective cover 121 can be detached without interference between the window part 142 and the optical rotator 30. Further, the structure that prevents interference with the optical rotator 30 using the expansion of the frame part 141 in the right-left direction produced by the front ends of the recesses of the canopy part 131 or the bottom part 133 riding on the stoppers of the frame part 141 is employed. Thus, an increase in the size of the safety scanner 10 can be suppressed.

Although, in the present embodiment, there is described an example in which the frame part 141 includes the upper frame 151, the coupling frame 152, and the lower frame 153, the configuration of the frame part 141 of the present invention is not limited thereto. For example, the frame part 141 includes an upper frame which extends along the outer edge of the canopy part 131, and a coupling frame which extends along the outer edge of the coupling part 132 and couples the rear end of the upper frame to the rear end of the base part. The window part and the frame part are joined to the base part with an adhesive. According to such a configuration, the window part and the frame part, and the base part can be individually molded. Thus, the protective cover 121 can be easily manufactured.

Although, in the present embodiment, there is described an example in which the receiver lens 34 concentrates the reflected light RL, the configuration of a light receiving system for the reflected light RL of the present invention is not limited thereto. For example, the optical rotator 30 may not be provided with the receiver lens 34, and the receiver mirror may be a concave mirror which has a concave reflecting surface, reflect the reflected light RL toward the light receiving surface of the light receiving element 53, and concentrate the reflected light RL on the light receiving surface. According to such a configuration, it is possible to obtain a sufficient light receiving amount without using a receiver lens.

Although, in the present embodiment, there is described an example in which the measurement casing 120 is a molded article obtained by integrally forming the canopy part 131, the coupling part 132, and the bottom part 133, the configuration of the measurement casing 120 of the present invention is not limited thereto. For example, the canopy part 131, the coupling part 132, and the bottom part 133 may be individually formed as an upper casing, a coupling casing, and a lower casing, respectively.

Although, in the present embodiment, there is described an example in which the optical rotator 30 is rotatably supported by the upper support part 14 and the lower support part 15 which are attached to the back plate 135, a support mechanism for the optical rotator 30 of the present invention is not limited thereto. For example, the optical rotator 30 may be rotatably supported by the canopy part 131 (upper casing) and the bottom part 133 (lower casing). Further, the present invention is also applicable to the optical rotator 30 supported in a cantilever manner.

What is claimed is:

1. A safety scanner comprising:
a light source configured to emit a detection light;
an optical rotator configured to rotate around a rotation axis extending in a first direction to direct the detection light from the light source to a detection area and scan the detection area in a circumferential direction by the detection light;
a light receiving element configured to receive the detection light reflected from an object within the detection area directed by the optical rotator and configured to generate a light receiving signal;
an intruder determination section configured to determine a measuring position of the object in the detection area based on (a) a distance to the object corresponding to the light receiving signal and (b) a scanning angle of the detection light directed by the rotator, and configure to compare the measuring position with a protection area set in the detection area to determine the presence or absence of an intruder in the protection area;
a casing including an upper member, a lower member facing the upper member and a rear member coupling a rear end of the upper member and a rear end of the lower member, the optical rotator disposed between the upper member and the lower member; and
a protective cover coupled to the casing for protecting the optical rotator, the casing and the protective cover forming an enclosure that houses the light source, the optical rotator, the light receiving element and the intruder determination section for protecting the optical rotator, and the protective cover including a window disposed across an optical path of the detection light and the reflected light between the optical rotator and the detection area;
wherein the window is formed in a circular arc shape, corresponding to the optical path of the detection light and the reflected light, having a central angle larger than 180° with respect to the rotation axis.

2. The safety scanner according to claim 1, wherein a width between both ends of the window along a circumferential direction with respect to the rotation axis is larger than a width of a passage region of the optical rotator in a plane perpendicular to the rotation axis.

3. The safety scanner according to claim 2, wherein
the protective cover is detachably attached to the casing from the front side,
at least one of the upper member and the lower member includes a stopper for restricting movement of the protective cover in a front direction, and
the stopper has a shape projecting in a right-left direction from a side face of the casing, is disposed on a left side face and a right side face of the at least one of the upper member and the lower member, and is engaged with a recess formed on the protective cover.

4. The safety scanner according to claim 3, wherein a projection length of the stopper is formed in such a manner that the width between both ends of the window along the circumferential direction with respect to the rotation axis becomes wider than the width of the passage region of the optical rotator in the plane perpendicular to the rotation axis upon releasing the engagement with the recess.

5. The safety scanner according to claim 2, wherein
the protective cover is detachably attached to the casing from a front side and includes a stopper for restricting movement in a front direction with respect to the casing,
the stopper has a shape projecting in a right-left direction from an inner face of the protective cover, are disposed facing a left side face and a right side face of at least one of the upper member and the lower member, and is engaged with a recess formed on the left side face and the right side face.

6. The safety scanner according to claim 5, wherein a projection length of the stopper is formed in such a manner that the width between both ends of the window along the circumferential direction with respect to the rotation axis becomes wider than the width of the passage region of the optical rotator in the plane perpendicular to the rotation axis upon releasing the engagement with the recess.

7. The safety scanner according to claim 1, wherein
the protective cover further includes a frame that holds the window,
the frame includes an upper frame that extends along an outer edge of the upper member, a lower frame that extends along an outer edge of the lower member, and a coupling frame that extends along an outer edge of the rear member and couples a rear end of the upper frame to a rear end of the lower frame, and
the window and the frame are joined to each other with an adhesive.

8. The safety scanner according to claim 7, wherein
the protective cover further includes a base that is in contact with an upper face of the lower member and has a horseshoe shape, and
the base is joined to a lower end of the window with an adhesive and joined to the lower frame with an adhesive.

9. The safety scanner according to claim 1, wherein
the protective cover further includes a frame that holds the window, and a base that extends along an outer edge of the lower member, is in contact with an upper face of the lower member and has a horseshoe shape,
the frame includes an upper frame that extends along an outer edge of the upper member, and a coupling frame that extends along an outer edge of the rear member and couples a rear end of the upper frame to a rear end of the base, and
the window and the frame are joined to the base with an adhesive.

10. The safety scanner according to claim 1, wherein
the window has a linear shape in a plane including the rotation axis,
the optical rotator includes a receiver mirror that reflects the reflected light toward the light receiving element and a cylindrical lens that forms an image of reflected light reflected by the receiver mirror on a light receiving surface of the light receiving element, and
the cylindrical lens includes a cylindrical surface curved in the up-down direction.

* * * * *